(12) United States Patent
Tran Van et al.

(10) Patent No.: US 11,768,748 B2
(45) Date of Patent: Sep. 26, 2023

(54) DETECTION OF DEGRADATION OR AN ANOMALOUS STATE ACROSS HETEROGENOUS INTERNET-OF-THINGS DEVICES USING SYNTHESIZED SENSORS

(71) Applicant: Intel Corporation, Santa Clara, CA (US)

(72) Inventors: Hoang Tran Van, Phoenix, AZ (US); Neethu Elizabeth Simon, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/534,875

(22) Filed: Nov. 24, 2021

(65) Prior Publication Data

US 2022/0083414 A1 Mar. 17, 2022

(51) Int. Cl.
*G06F 11/00* (2006.01)
*G06F 11/30* (2006.01)
(Continued)

(52) U.S. Cl.
CPC ...... *G06F 11/3058* (2013.01); *G06F 11/0706* (2013.01); *G06F 11/076* (2013.01); *G06F 11/0772* (2013.01); *G06F 11/3089* (2013.01); *G06F 11/3409* (2013.01); *G06F 2201/81* (2013.01)

(58) Field of Classification Search
CPC .............. G06F 11/0703; G06F 11/0706; G06F 11/0736; G06F 11/0751; G06F 11/076; G06F 11/0766; G06F 11/0772; G06F 11/16; G06F 11/1608; G06F 11/1616; G06F 11/1629; G06F 11/165; G06F 11/1666; G06F 11/3003; G06F 11/3013; G06F 11/3058; G06F 11/3089; G06F 11/34;
(Continued)

(56) References Cited

U.S. PATENT DOCUMENTS

| | | | | |
|---|---|---|---|---|
| 5,761,090 A | * | 6/1998 | Gross ................. | G05B 19/4184 706/45 |
| 6,549,858 B1 | * | 4/2003 | Shelley ................ | G10K 15/02 702/56 |

(Continued)

OTHER PUBLICATIONS

Masti, Daniele, Daniele Bernardini, and Alberto Bemporad. "A machine-learning approach to synthesize virtual sensors for parameter-varying systems." European Journal of Control 61 (2021): 40-49. (Year: 2021).*

(Continued)

*Primary Examiner* — Anthony J Amoroso
(74) *Attorney, Agent, or Firm* — Jordan IP Law, LLC

(57) ABSTRACT

Systems, apparatuses, and methods include technology that generates synthesized sensors that synthesize operations of a first plurality of sensors using independent variables, such as sensors, as first inputs, where the first plurality of sensors is to sense conditions of operations of a system as the system executes a process based on a first input, and further where the conditions are stored as a first output. The technology generates a second output based on the synthesized sensors and the first input and detects whether one or more of a degradation and an anomalous state exists based on a comparison of the first output to the second output.

21 Claims, 14 Drawing Sheets

(51) Int. Cl.
*G06F 11/07* (2006.01)
*G06F 11/34* (2006.01)

(58) Field of Classification Search
CPC ............ G06F 11/3409; G06F 11/3447; G06F 11/3452; G06F 2201/81
See application file for complete search history.

(56) References Cited

U.S. PATENT DOCUMENTS

| 10,678,244 | B2* | 6/2020 | Iandola ............... G06F 18/2148 |
| 10,749,961 | B2* | 8/2020 | Sundaresan ............ G01N 27/00 |
| 2019/0138423 | A1* | 5/2019 | Agerstam ............... G06F 18/21 |
| 2019/0138848 | A1* | 5/2019 | Gonzalez Aguirre ....................... G06V 10/772 |
| 2020/0285997 | A1* | 9/2020 | Bhattacharyya ......... G06N 7/00 |
| 2021/0004461 | A1* | 1/2021 | Guilley ................ H01L 23/576 |
| 2021/0405632 | A1* | 12/2021 | Wouhaybi .......... G05B 23/0221 |
| 2022/0135059 | A1* | 5/2022 | Lim ..................... B60W 50/02 701/28 |

OTHER PUBLICATIONS

A. Shylendra, P. Shukla, S. Mukhopadhyay, S. Bhunia and A. R. Trivedi, "Low Power Unsupervised Anomaly Detection by Nonparametric Modeling of Sensor Statistics," in IEEE Transactions on Very Large Scale Integration (VLSI) Systems, vol. 28, No. 8, pp. 1833-1843, Aug. 2020 (Year: 2020).*

H. H. W. J. Bosman, A. Liotta, G. Iacca and H. J. Wörtche, "Anomaly Detection in Sensor Systems Using Lightweight Machine Learning," 2013 IEEE International Conference on Systems, Man, and Cybernetics, 2013, pp. 7-13 (Year: 2013).*

M. T. H. Anik, J.-L. Danger, S. Guilley and N. Karimi, "Detecting Failures and Attacks via Digital Sensors," in IEEE Transactions on Computer-Aided Design of Integrated Circuits and Systems, vol. 40, No. 7, pp. 1315-1326, Jul. 2021 (Year: 2021).*

* cited by examiner

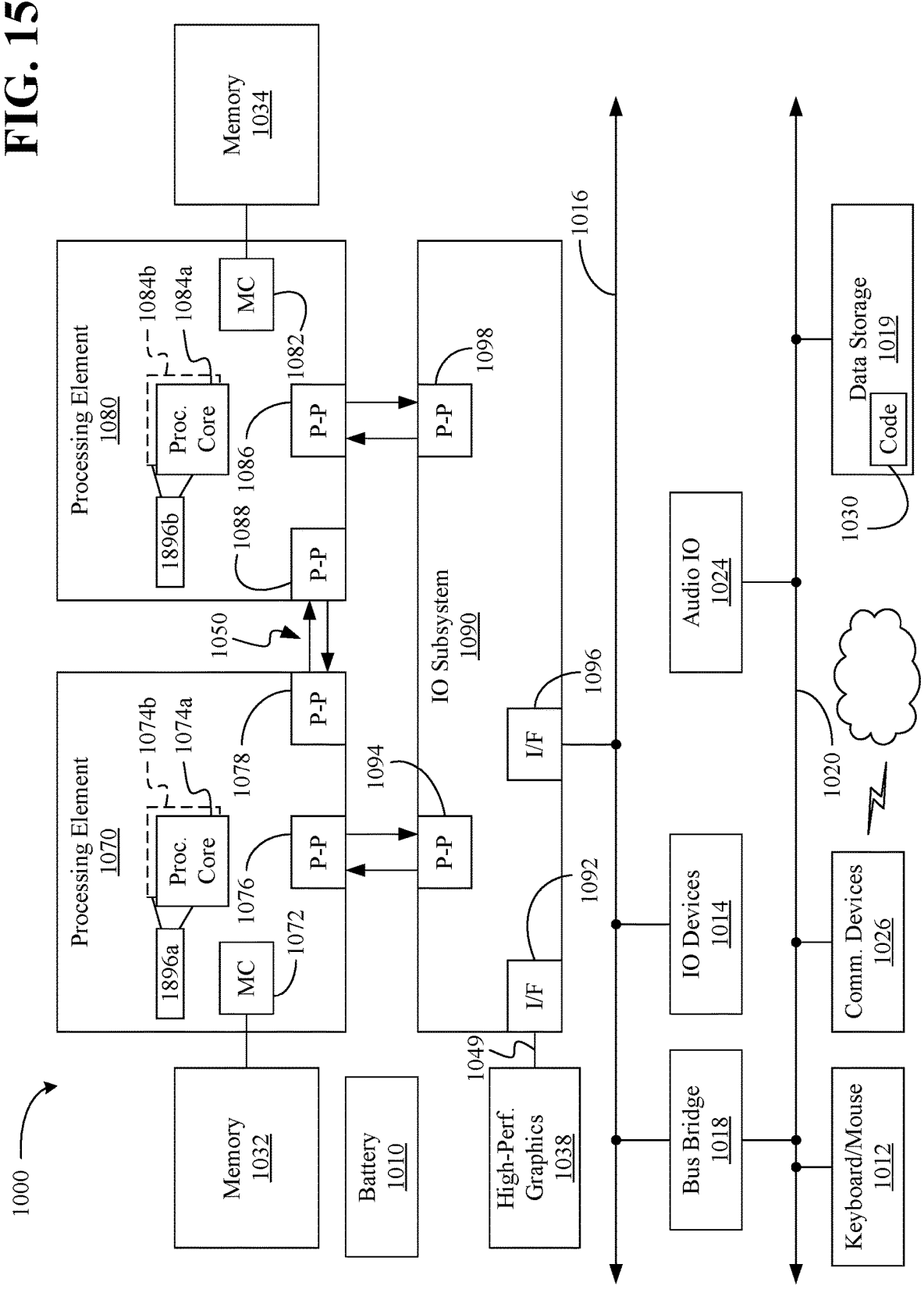

US 11,768,748 B2

DETECTION OF DEGRADATION OR AN ANOMALOUS STATE ACROSS HETEROGENOUS INTERNET-OF-THINGS DEVICES USING SYNTHESIZED SENSORS

TECHNICAL FIELD

Embodiments generally relate to identifying and developing a baseline model comprising synthesized sensors that generate an output. The output is compared with an output of a machine to detect a fault and/or anomaly based upon differences between the outputs.

BACKGROUND

Numerous industries include complex systems (e.g., collections of machines, devices, processors, and sensors in automobiles, manufacturing, industrial, etc. that work together in some manner) that are dictated by performance, efficiency and criterions for safety, reliability, ecology, and profitability. As the technology and design complexity increases, monitoring health conditions may become challenging. Thus, errors may be difficult to detect if at all.

BRIEF DESCRIPTION OF THE DRAWINGS

The various advantages of the embodiments will become apparent to one skilled in the art by reading the following specification and appended claims, and by referencing the following drawings, in which:

FIG. 15 is a block diagram of an example of a multi-processor based computing system according to an embodiment.

DESCRIPTION OF EMBODIMENTS

Some embodiments develop a baseline (e.g., a "healthy") model that is compared with a system under consideration. A delta may be generated based on outputs of the baseline model and the system. The delta may guide decision making processes, such as detecting a fault or anomaly. For example, some embodiments generate generic composite functions that are transformed into synthesized sensors. The synthesized sensors may correspond to actual sensors of a system so as to provide a healthy baseline for the actual sensors. Combining and transforming the composite functions to form synthesized sensors may be a broad-based approach that models non-linear effects resulting from mutual interactions between subsystems of the system.

Figure 1:
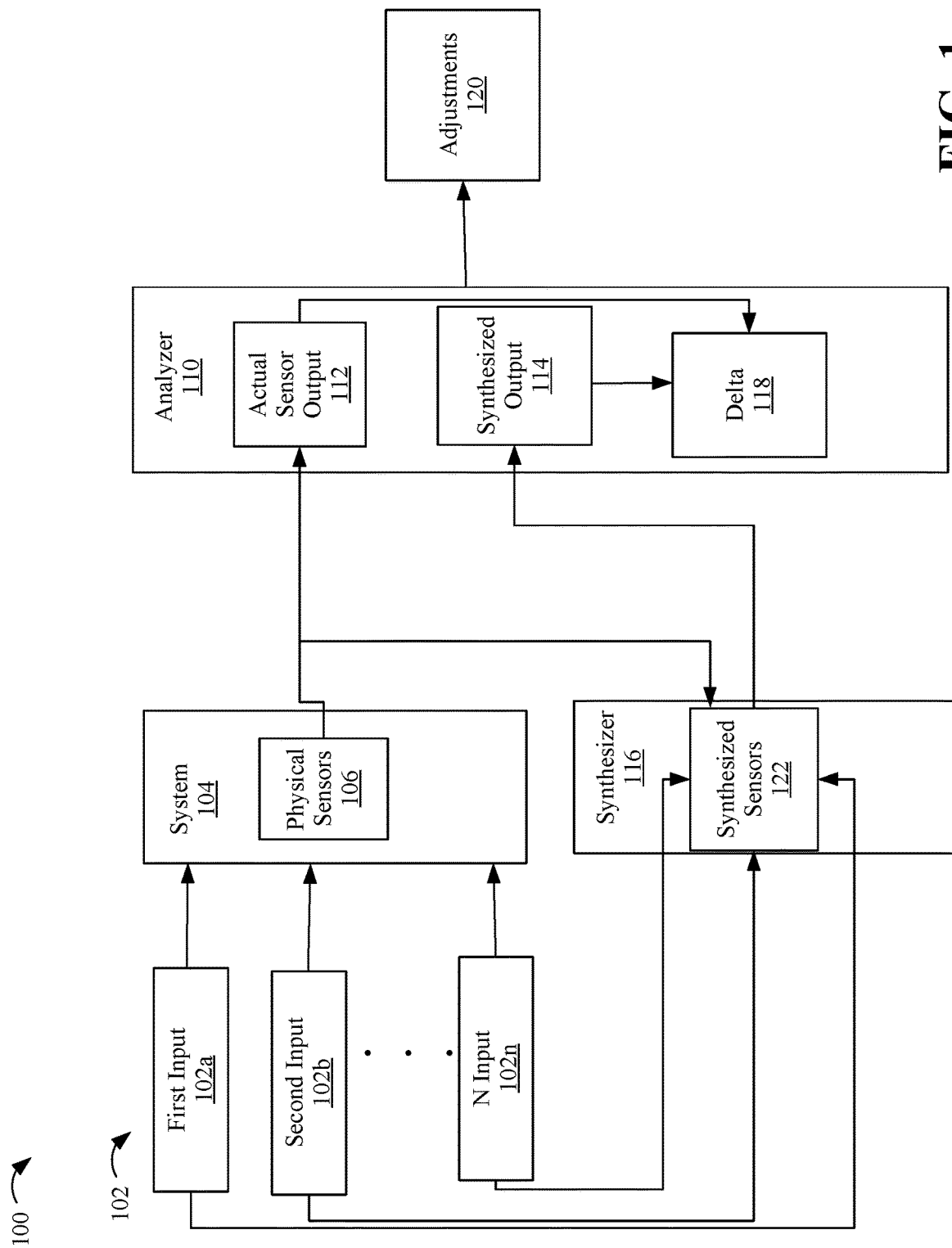
FIG. 1 is a block diagram of an example of a fault detection and processing architecture according to an embodiment.

Turning now to FIG. 1, a fault detection and processing architecture 100 is illustrated. For example, a system 104 (e.g., an internet-of-things device) includes physical sensors 106 (e.g., a first plurality of sensors) that sense operating conditions (e.g., temperature, pressure, etc.) of the system 104. The sensed operating conditions may be set as an actual sensor output 112 (e.g., first output). A synthesizer 116 generates synthesized operations that synthesize operations of physical sensors 106 of a system 104. For example, the synthesizer 116 develops composite functions. The composite functions may be reused and adjusted across a plurality of different systems. For example, after developing these composite functions, the synthesizer 116 reuses the composite functions for many other machines. Even though the various machines are different from each other, the responses of the machines to the inputs follow the various laws (e.g., gravity, interaction, thermal, chemical reaction, etc.). Indeed, these composite functions may be derived to capture these behaviors and interactions (e.g., 1st, 2nd, or 3rd Order) between processes of the system. Thus, the synthesizer 116 may operate with a plurality of different systems by adjusting the composite functions to generate synthesized sensors 122. In this example, the composite functions are adjusted based on the system 104.

The synthesizer 116 receives the same first-N inputs 102a-102n as the system 104. The synthesizer 116 generates a synthesized output 114 (e.g., a second output) based on synthesized operations and first input-N input 102a-102n. The analyzer 110 detects whether one or more of a degradation or an anomalous state exists in system 104 based on a comparison of the actual sensor output 112 (e.g., first output) to the synthesized output 114 (e.g., a second output).

For example, the system 104 receives a plurality of inputs including the first input 102a, the second input 102b and the N input 102n (e.g., commands to execute a process, instructions to execute a process, current, voltage, air, chemicals, etc. generally known as independent variables). The physical sensors 106 may sense operating conditions of the system 104 as the system 104 executes operations based on the first-N inputs 102a-102n. The outputs of the physical sensors 106 may provide details as to the nature of the system 104, for example whether the system 104 is in an anomalous state or in a fault state, or if a subject that the system 104 is sensing is in an anomalous state or a fault state.

The synthesizer 116 may simulate the physical sensors 106 via the synthesized sensors 122. The synthesized sensors 122 may be composite functions that are modified based on interactions between the physical sensors 106 and/or variables (e.g., operating conditions known as independent conditions or variables) associated with the physical sensors 106. For example, as discussed above, the synthesizer 116 generates composite functions that may be applied to any system. The synthesizer 116 computes coefficients of the composite functions based on operating conditions (e.g., pressure, temperature, voltage, current, etc.) that may be detected from the first-N input 102a-102n. The synthesized operations may correspond to the synthesized sensors 122. For example, each synthesized operation may simulate the operation and output of a sensor of the physical sensors 106 based on the first-N inputs 102a-102n. The synthesizer 116 computes the coefficients based on variables (e.g., operating conditions and interactions) associated with the physical sensors 106.

In some examples, the composite functions may be the same for each of the physical sensors 106. To fully describe the interactions between the physical sensors 106, the coefficients of the composite functions may be individually adjusted. Furthermore, the coefficients may be individually adjusted based on the operating conditions of the system 104. The operating conditions may be derived from the first-N input 102a-102n as well actual physical measurements from some of the physical sensors 106. Thus, the synthesized sensors 122 may model the physical sensors 106 under ideal working conditions. An anomaly or error may be detected when the synthesized output 114 of the synthesized sensors 122 is different from the actual sensor output 112 of the physical sensors 106.

As an example, suppose that a first synthesized sensor of the synthesized sensors 122 models a first physical sensor of the physical sensors 106. Coefficients of the composite functions representing the first synthesized sensor may be individually adjusted based on the interactions between the first physical sensor and other first-N input 102a-102n of other physical sensors 106. Thus, the composite functions of the first synthesized sensor may model an expected output and behavior of the first physical sensor. When a difference between an output of the first synthesized sensor and the output of the first physical sensor meets a threshold (e.g., 3%), an anomaly may be detected since the first physical sensor is no longer providing an expected output. Outputs of pairs of the physical sensors 106 and the synthesized sensors 122 may thus be compared to determine if a fault, anomaly, or degradation exists.

Thus, the synthesized sensors 122 may be considered digital versions (comprised of composite functions) of the physical sensors 106 and simulate operations of the physical sensors 106 with the synthesized sensors 122. The analyzer 110 detects a normal operation state in response to a delta 118 (e.g., a deviation pattern) of the actual sensor output 112 of the system 104 (e.g., first output) and the synthesized output 114 (e.g., second output) of the synthesized sensors 122 being below a predetermined threshold. The delta 118 may be the synthesized output 114 subtracted from the actual sensor output 112. The analyzer 110 likewise detects the one or more of the degradation or the anomalous state in response to the delta 118 (e.g., the deviation pattern) between the actual sensor output 112 (e.g., first output) of the system 104 and the synthesized output 114 (e.g., second output) of the synthesized sensors 122 meeting the predetermined threshold.

For example, if the system 104 is operating within normal bounds, the delta 118 may be a zero or below an acceptable threshold that may be predetermined. If delta 118 is a non-zero number or above the threshold, the analyzer 110 may conclude that a degradation or anomaly has occurred. That is, the analyzer 110 may determine that the fault level is proportional to the magnitude of the delta 118. Thus, if the inherent (e.g., intrinsic) properties of the system 104 remain unchanged (i.e., a healthy condition), the synthesized output 114 of the synthesized sensors 122 and the actual sensor output 112 of the physical sensors will follow each other closely such that delta 118 will be a low value even if the system 104 is operated at different conditions. If the system 104 begins to degrade, the intrinsic properties of the system 104 changes, hence delta 118 will be non-zero and the system 104 will be observed as indicating a fault.

In some embodiments, specific faults may be identified by comparing the deviation pattern of each actual sensor of the physical sensors 106 against a corresponding synthesized sensor of the synthesized sensors 122 to a defined fault pattern. For example, a first physical sensor of the physical sensors 106 may correspond to a first synthesized sensor of the synthesized sensors 122. That is, the first synthesized sensor may model a first physical sensor of the physical sensors 106. The specific output of the first physical sensor may be compared to the output of the first synthesized sensor to generate a delta and determine if the first physical sensor senses an anomalous state or degradation. Notably, the specific output is not compared against outputs of other synthesized sensors (not the first synthesized sensor) of the synthesized sensors 122. Thus, if the first physical sensor is determined to be sensing an anomalous state or degradation, and if there is direct correlation, a subsystem corresponding to the first physical sensor (e.g., the first physical sensor senses operations of the subsystem) may be deemed to be in an anomalous state or degraded. In some other cases where there is no direct link, fault may propagate from a first subsystem to other subsystems, in such cases the fault pattern is used to diagnose specific fault(s).

The analyzer 110 may generate adjustments 120 based on the delta 118. For example, by monitoring the trend and value of the delta 118, the analyzer 110 may assess a fault severity, the remaining useful operation time until next maintenance, the logistics, the planning for spare parts and inventory for the system 104. In some examples, the analyzer 110 may adjust the system 104 for more efficient operation. For example, if an anomaly exists in the system 104, the analyzer 110 may determine whether a modification to the system 104 may mitigate or bypass the anomaly. For example, suppose that a first physical sensor of the physical sensors 106 monitors a first component of the system 104. Further suppose that an output of the first physical sensor does not match an output of a corresponding first synthesized sensor of the synthesized sensors 122 such that the delta 118 is non-zero. The first component may be identified as malfunctioning based on the delta 118 being non-zero. As a result, the analyzer 110 may bypass the first component for operations. Instead, processes in the system 104 may be shifted to a second component of the system 104 that is not malfunctioning. In other cases, fault mitigation could be done by limiting the full potential operating range to a lower limit while waiting for maintenance to be performed.

In some embodiments, the synthesizer 116 designs generic composite functions. The synthesizer 116 may use the generic composite functions to build the synthesized sensors 122 to strategically identify the mutual and nonlinear effect of change in one (or several) sensors of the physical sensors 106 (e.g., subsystem processes in same and/or multiple machines) to the one being modeled.

For example, generic composite functions may correspond to a group of several sensors designed to identify what are the processes, and how they affect a sensor being synthesized. Each generic composite function is associated with an influence coefficient statistically computed from raw data to account for the level of that correlation. Several generic composite functions may be combined (e.g., added) together to form a synthesized sensor of the synthesized sensors 122 that is linked to other sensors of the synthesized sensors 122 to model mutual effects. The influence coefficients may be adjusted based on various factors, including operating parameters.

Thus, the synthesized sensors 122 may be composed of composite functions representing subsystem characteristics and mutual interactions between the subsystems, including nonlinearity effects resulting from the system 104 operation. For example, nonlinearity and propagation effects may occur if a first subsystem of the system 104 fails to operate correctly. The failure of the first subsystem may cause a second subsystem to appear faulty. That is, suppose that the first subsystem cannot cool a coolant to a specified temperature to cool the second subsystem. The second subsystem may overheat since the coolant cannot properly cool the second subsystem. The second subsystem however is not malfunctioning even though the second subsystem is overheating, rather the first subsystem is malfunctioning causing the second subsystem to overheat. Thus, the synthesized sensors 122 may be enhanced relative to predictive sensor network applications at least to the extent that the synthesized sensors 122 are more readily adapted for identifying source points of anomalies. That is, the composite functions comprising the synthesized sensors 122 contain united features of the system 104. As the operating environment varies and the first-N inputs 102($a$)-102($n$) to the system 104 changes, different sensor outputs may be expected according to the machine design principles, and the composite functions may accurately identify whether anomalous states exist.

The synthesizer 116 may not necessarily synthesize the physical sensors 106 based on principles of physics. The synthesizer 116 relies on composite functions to derive the synthesized sensors 122 by considering the nonlinearity and mutual interaction (observed and hidden correlation) between multiple sensors in the system 104. Thus, the same set of composite functions (e.g., statistical modelling functions) may be re-used for generating different synthesized sensors for different systems and/or cases as only the coefficient associated with a composite function may need to be calculated from data statistics (explained below in greater detail). Thus, a generic set of functions may cover most industrial physical systems to generate models that can work across different operating conditions.

Thus, embodiments go beyond simply detecting if a sensor exceeds a physical threshold and/or traditional sensor fusion methods. Rather, the synthesizer 116 may model interactions between different sensors to detect anomalies and where the anomalies occur based on such interactions. The synthesizer 116 may generate an alarm indicating a fault. Furthermore, the synthesized sensors 122 are independent of time series data and may not require continuous learning to improve model accuracy. In this case, the accuracy only depends on the assumption of the mutual effect order used (see Table 1), the appropriate independent variables selected, and the completeness of data covering the entire operating envelop of the machine. As a statistical model of the physical sensors 106 is built based on observed correlations (including hidden ones), the synthesized sensors 122 ensure high accuracy and determinism. Hence any small deviation in the performance of the actual sensor will be detected, thus enabling timely predictive maintenance accuracy and efficiency.

The synthesized sensors 122 may be implemented in hardware and/or software implementations (e.g., via a non-transitory computer readable storage medium). The synthesized sensors 122 may form a baseline model that is a virtualized machine or a digital copy of the system 104. The system 104 may be a real machine, such as aircraft engine, power plants, that is executing real-time operations. The synthesizer 116 and analyzer 110 may be dedicated to anomaly detection in complex and critical industrial systems. The synthesizer 116 and analyzer 110 may not require large volume of data for training. Further, neither fault data nor extensive data pre-processing (e.g., feature engineering) is required for the synthesizer 116 to build highly accurate models.

As an example, consider an electrical motor that has a resistive load that is sensitive to temperature. The electrical motor may be the system 104. Some embodiments include a metric of comparison (e.g., delta) between each respective synthesized sensor of the synthesized sensors 122 and a corresponding actual sensor of the physical sensors 106 corresponding to the respective synthesized sensor according to equation 1 below:

Equation 1

$$\text{Delta} = \text{Actual Sensor value}(s) - \text{Synthesized Sensor}(s) \quad (1)$$

The first-N inputs 102$a$-102$n$ may comprise 3 independent variables (e.g., voltage, external load, temperature) in this example, and one output variable (e.g., current) may be modeled by the synthesized sensors 122 to generate a synthesized value. An actual value of the actual current may be sensed by the physical sensors 106. The synthesized value may be compared to the actual value to determine whether an anomalous state exists.

Some examples may have accuracy ranges close to a target range (±1-3% difference), which results in accurate actions. For example, a lack of accuracy would trigger false alarms and is costly as the operation will be suspended for verification. On the other hand, a misdetection may be even more damaging as the system 104 continues to operate until a forced, catastrophic shutdown occurs. In this regard, a more deterministic and effective approach is needed.

Also, to detect any new changed condition (e.g., intrinsic property changed due to machine degeneration), continuous learning may be required for conventional implementations. For example, a conventional statistical model needs to be updated every time there is a condition changes to improve the model accuracy. So as the efficiency of industrial machines degenerates over time, a statistical model would need to be updated continuously. Furthermore, such continuous learning anomaly systems may require that the algorithms to be highly effective to catch these changes and learn the new changed condition to efficiently detect anomalies which is difficult to implement and requires significant processing power. Embodiments as described herein may generate models that are readily adaptable to numerous scenarios with enhanced flexibility.

Figure 2:
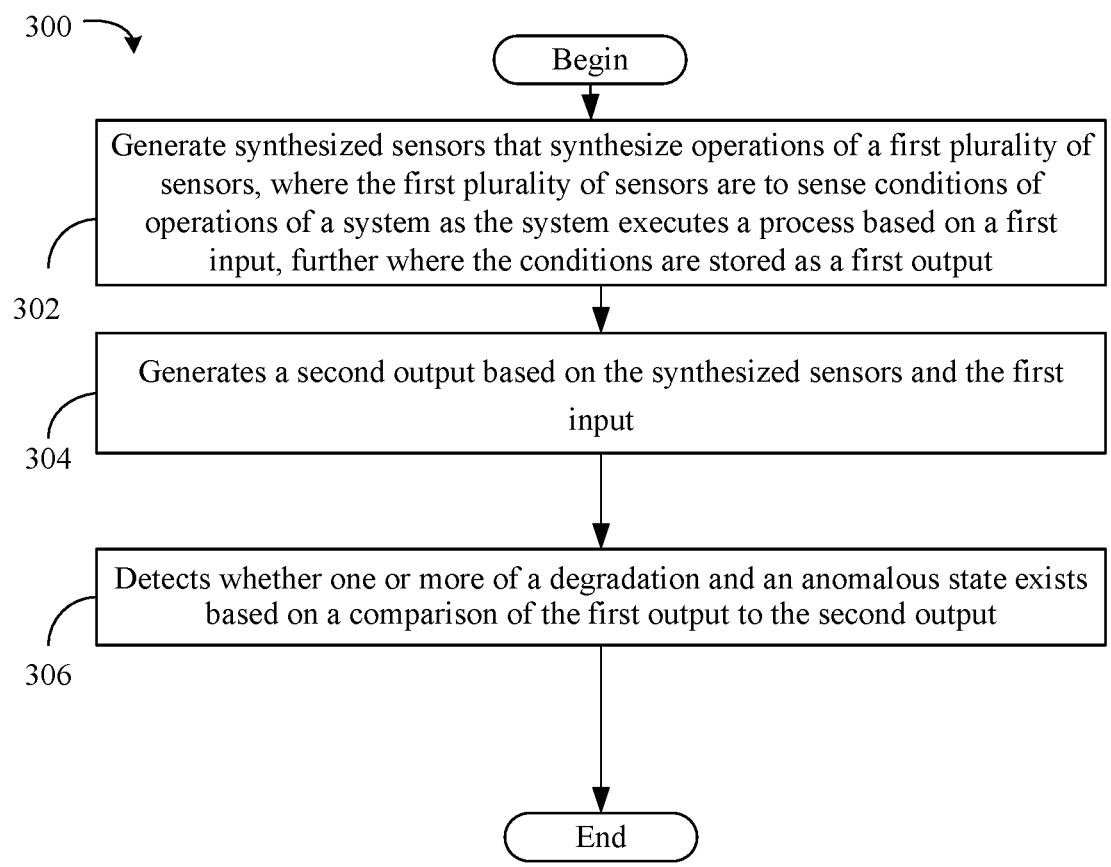
FIG. 2 is a flowchart of an example of a method of detecting anomalous events and/or a degraded state according to an embodiment.

FIG. 2 shows a method 300 of detecting anomalous events and/or a degraded state according to embodiments herein. The method 300 may generally be implemented with the embodiments described herein, for example, the fault detection and processing architecture 100 (FIG. 1), already discussed. In an embodiment, the method 300 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 generates synthesized sensors that synthesize operations of a first plurality of sensors, where the first plurality of sensors sense conditions of operations of a system as the system executes a process based on a first input, further where the conditions are stored as a first output. Illustrated processing block 304 generates a second output based on the synthesized sensors and the first input. Illustrated processing block 306 detects whether one or more of a degradation and an anomalous state exists based on a comparison of the first output to the second output.

In some embodiments, the method 300 further includes generating composite functions that are applicable to different pluralities of sensors, adjusting coefficients of the composite functions based on interactions between the first plurality of sensors and sensor inputs of the first plurality of sensors to generate adjusted composite functions, and setting the synthesized sensors as the adjusted composite functions. In some embodiments, the method 300 further includes determining the coefficients based on variables associated with the first plurality of sensors and the inputs of the first plurality of sensors. In some embodiments, the method 300 further includes detecting a normal operation state in response to a deviation pattern of the first output and the second output being below a predetermined threshold. In some embodiments, the method 300 further includes detecting the one or more of the degradation and the anomalous state in response to a deviation pattern between the first output and the second output meeting a threshold. The synthesized sensors are digital versions of the first plurality of sensors.

FIGS. 3-7 illustrate a process 350 to generate a composite function. The process 350 may generally be implemented with the embodiments described herein, for example, the fault detection and processing architecture 100 (FIG. 1) and/or the method 300 (FIG. 2), already discussed. Process 350 may center on deriving composite variables for composite functions to synthesize a sensor. To illustrate the process 350, consider a pneumatic system that is to be modeled. The process 350 will synthesize the system pressure of the pneumatic system as function of 3 independent variables (e.g., valve position, pump speed, and temperature).

Figure 3:
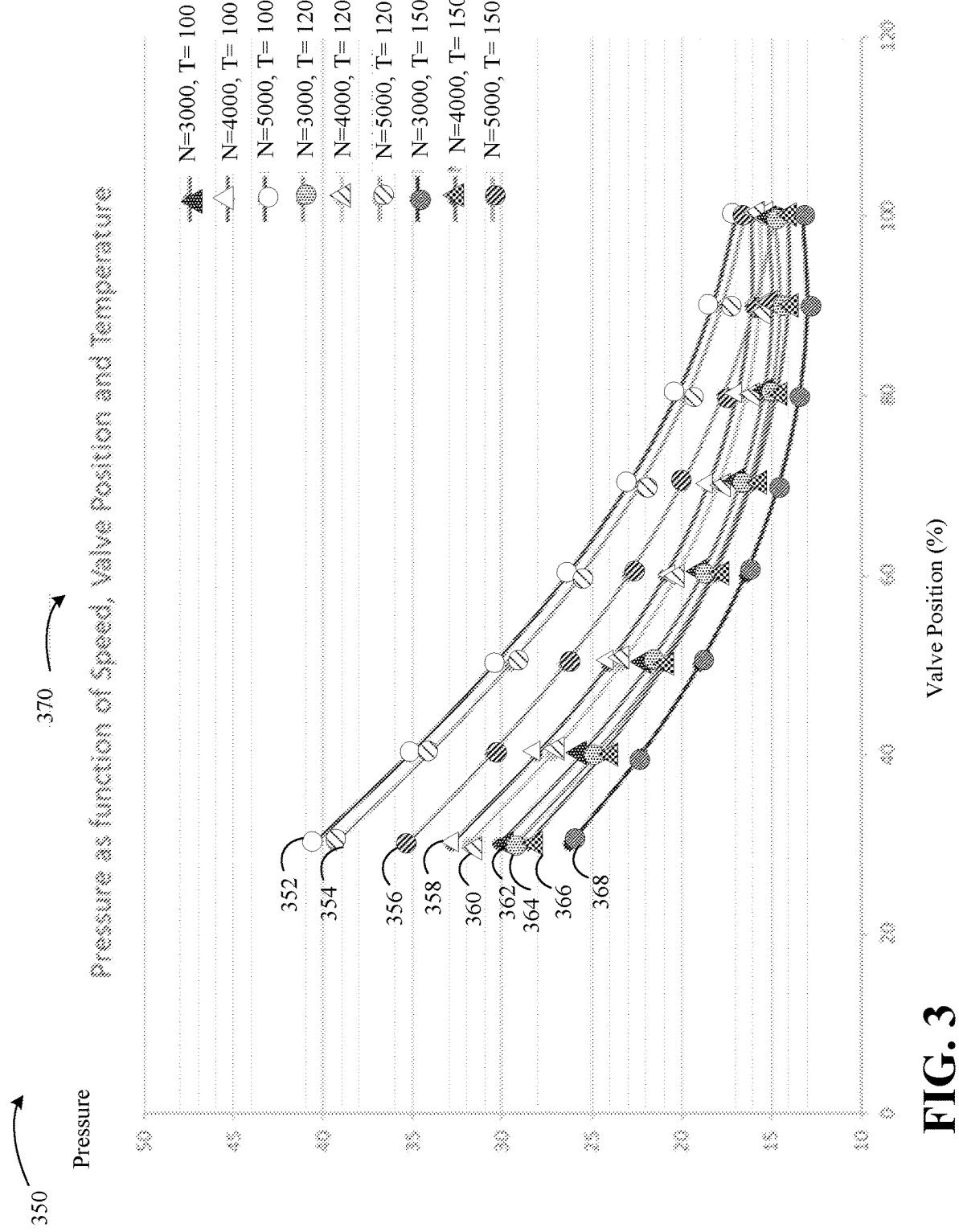
FIG. 3 is an example of pressure curves showing pressure as function of valve position, speed and temperature according to an embodiment.

FIG. 3 shows pressure as function of valve position, speed, and temperature graph 370. As illustrated, a series of pressure curves 352, 354, 356, 358, 360, 362, 364, 366, 368 are plotted as function of these independent variables valve position, speed, and temperature. The form of the pressure curves 352, 354, 356, 358, 360, 362, 364, 366, 368 implies that the pressure curves 352, 354, 356, 358, 360, 362, 364, 366, 368 may be modeled by using the $2^{nd}$ order equation as shown in Equation 2:

Equation 2

$$P = C1.V^2 + C2.V + C3 \qquad (2)$$

In Equation 2, P is pressure, while V is valve position. C1, C2 and C3 are coefficients. Equation 2 only shows the relationship between pressure and valve position. Thus, to account for speed (N) and temperature (T) changes, the coefficients C1, C2, and C3 may be expressed as a function of variables N and T. For example, the pressure data has been selected at a constant temperature for each of the pressure curves 352, 354, 356, 358, 360, 362, 364, 366, 368 as shown in FIG. 3. As an example, the pressure curve 352 has a speed (N) of 5000 with a temperature (T) of 100, while the pressure curve 356 has a speed (N) of 5000 and a temperature (T) of 150. Each of the pressure curves 352, 354, 356, 358, 360, 362, 364, 366, 368 may be represented with a quadratic equation as shown in equation 3 below:

Equation 3

$$P = A.V^2 + B.V + C \qquad (3)$$

In Equation 3, P is pressure while V is valve position.

Figure 4:
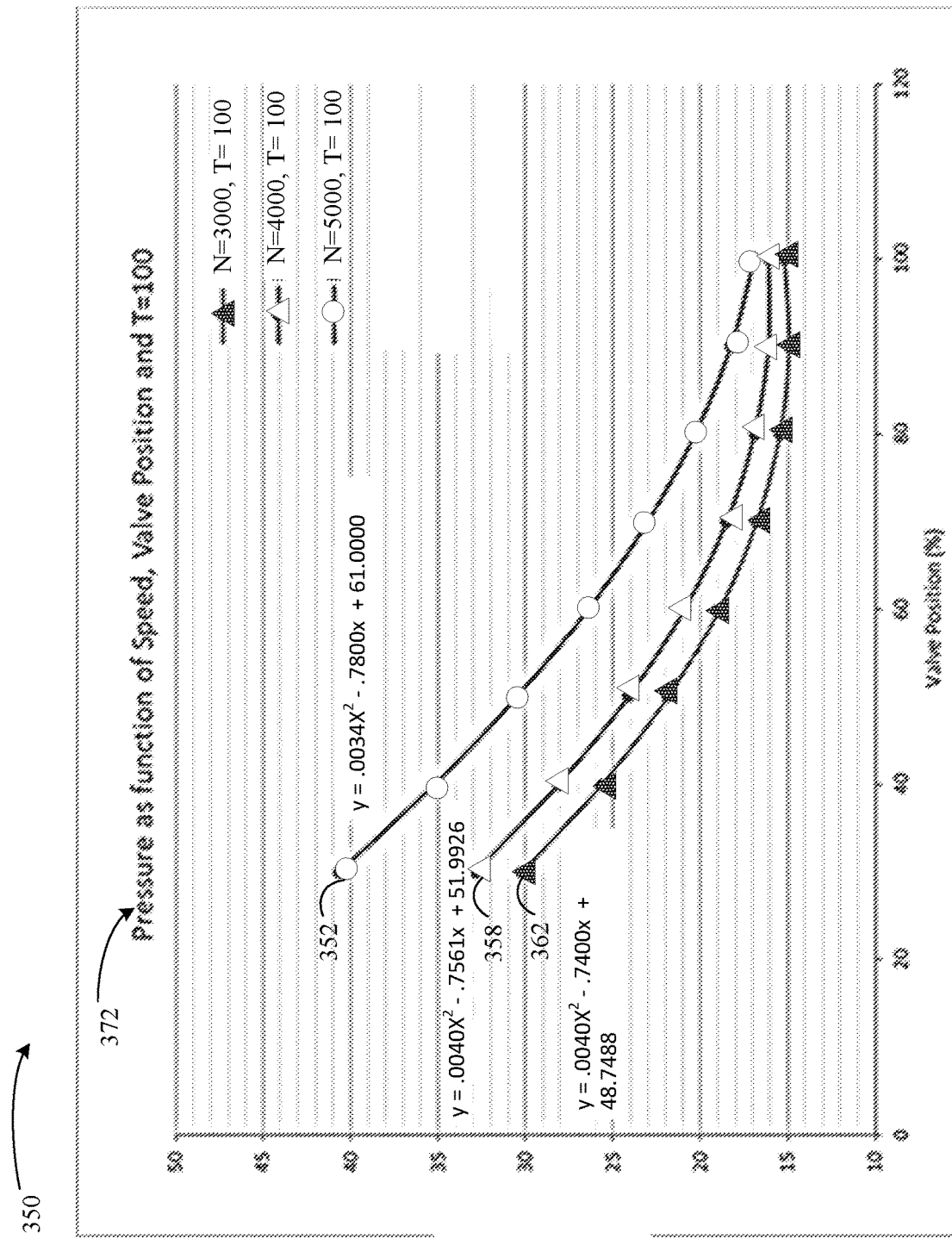
FIG. 4 is an example of pressure curves showing pressure as function of valve position, speed, and with temperature being set to 100° F. according to an embodiment.
Figure 6:
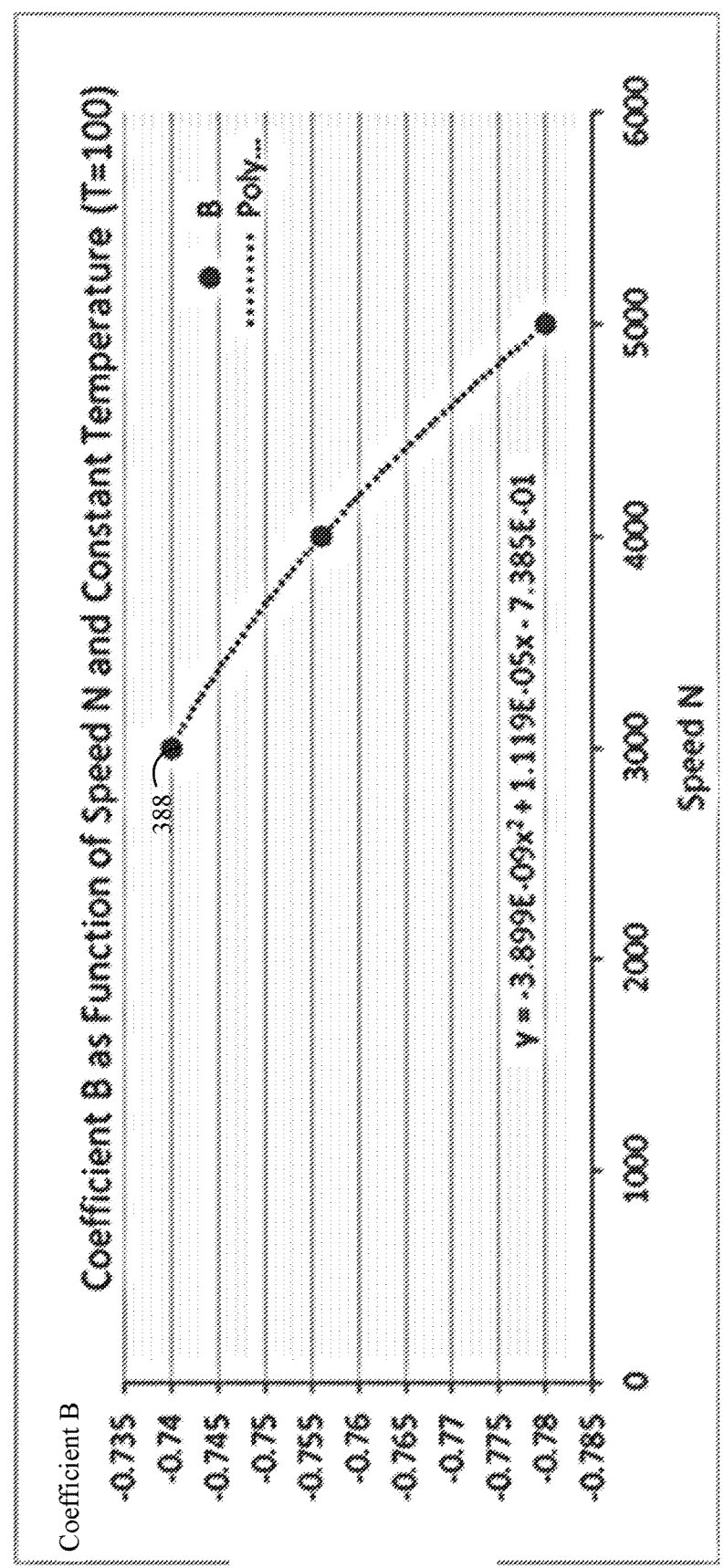
FIG. 6 is an example of a graph of coefficient B as a function of speed N and constant temperature according to an embodiment.
Figure 7:
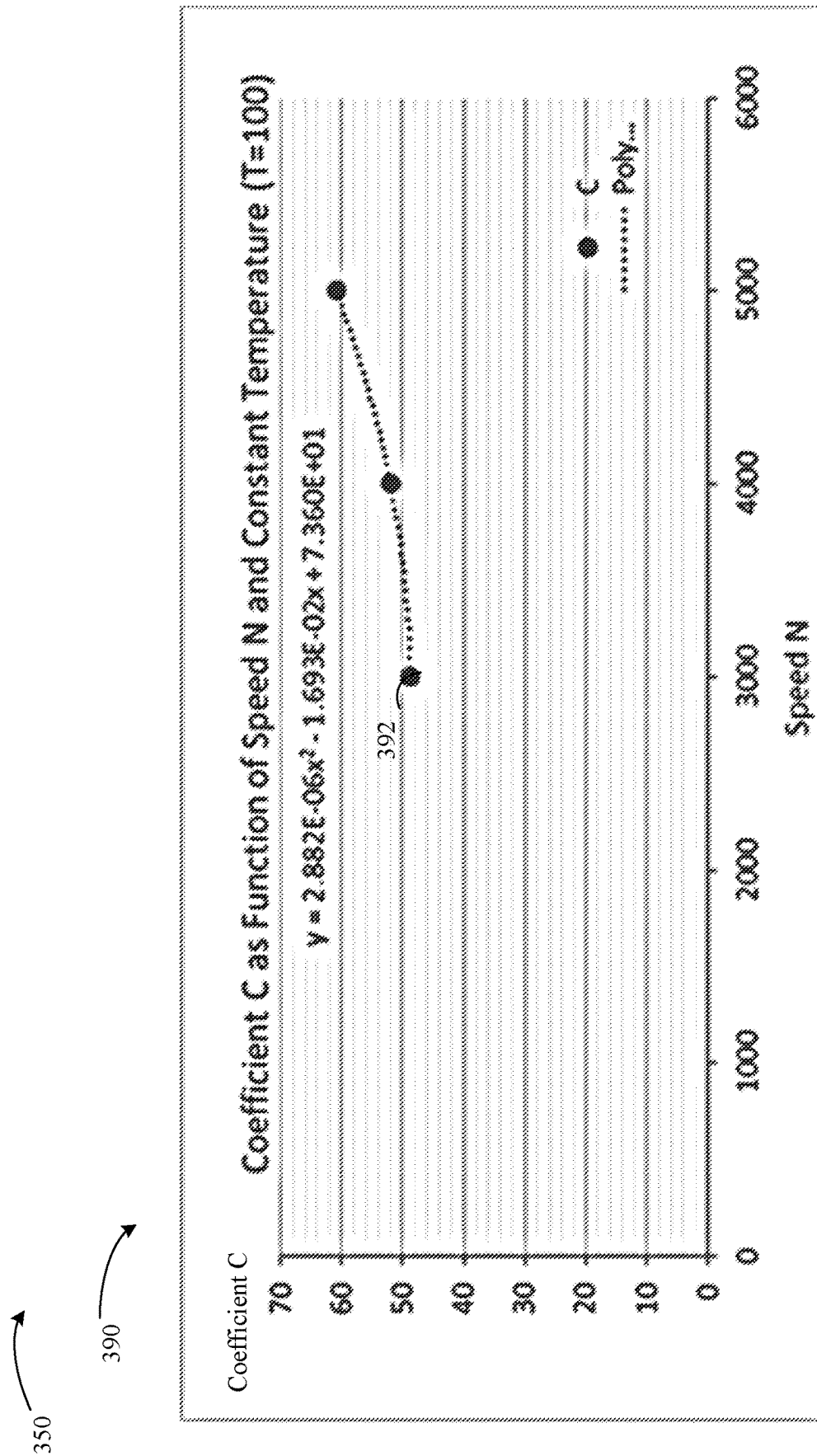
FIG. 7 is an example of a graph of coefficient C as a function of speed N and constant temperature according to an embodiment.

In FIG. 4, pressure as function of valve position, speed, and with temperature being set to 100 F (i.e., T=100 F) is illustrated as graph 372. Thus, only three of the pressure curves 352, 358, 362, which have temperature set to 100 F, are illustrated from the pressure curves 352, 354, 356, 358, 360, 362, 364, 366, 368. At this point the process 350 may more manageably derive a common equation for pressure P as function of valve V position and speed only (T=100 F). In FIG. 4, respective quadratic equations with coefficients A, B, C including set values are illustrated next to the respective pressure curve 352, 358, 362. That is, the pressure curve 352 corresponds to y=0.0034X$^2$−0.7800x+61.0000, the pressure curve 358 corresponds to y=0.0040X$^2$−0.7561x+51.9926 and the pressure curve 362 corresponds to y=0.0040X$^2$−0.7400x+48.7488. By correlating each coefficient (i.e., A, B, C) of the Equation 3 (i.e., a quadratic equation), embodiments may obtain another second order equation for deriving coefficients A, B, C as function of Speed N as shown in FIGS. 5, 6 and 7 respectively.

Figure 5:
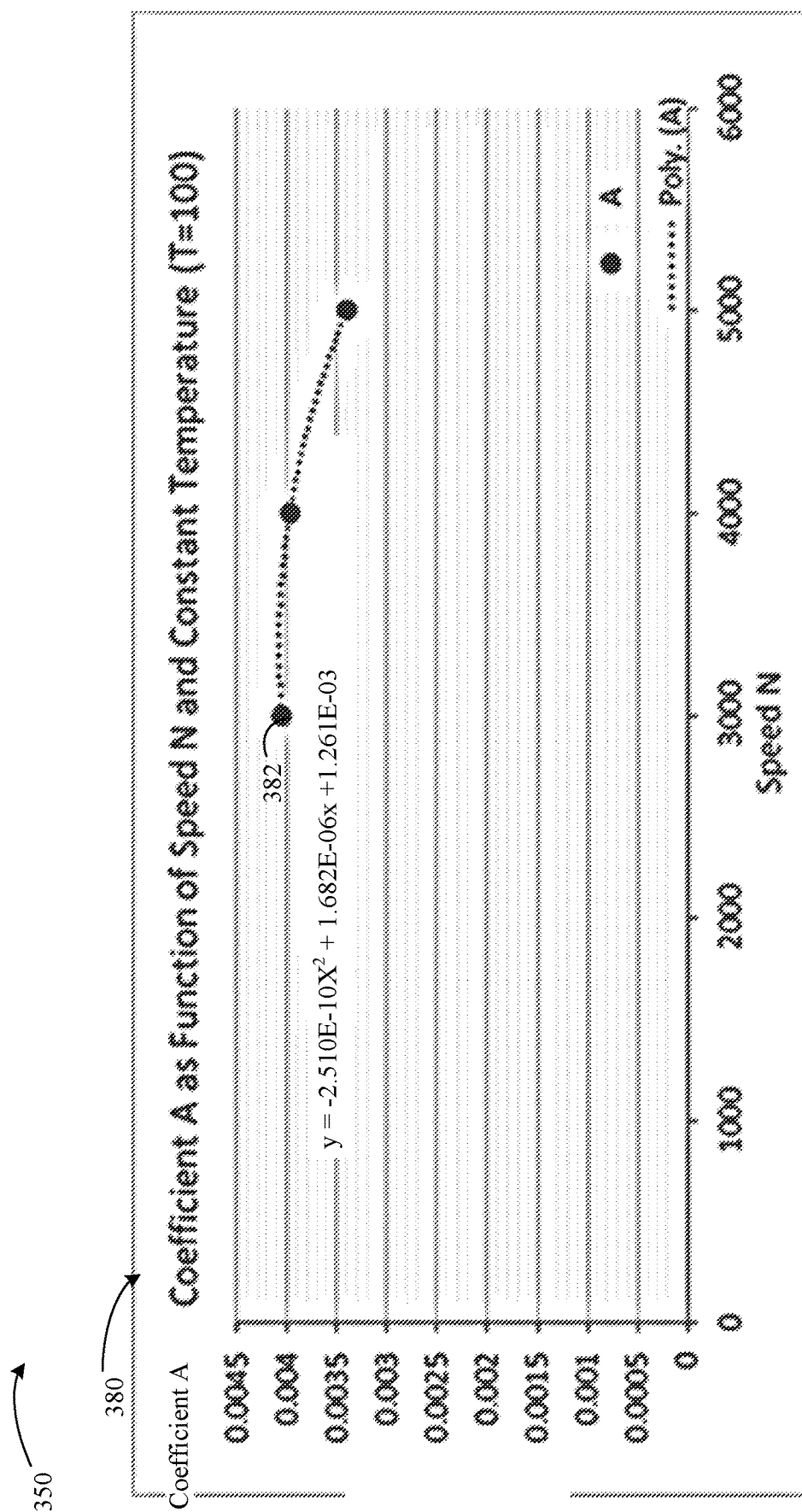
FIG. 5 is an example of a graph mapping the coefficient A as a function of speed N and constant temperature according to an embodiment.

FIG. 5 illustrates a graph 380 mapping the coefficient A as a function of speed N and constant temperature (i.e., T=100). Curve 382 illustrates the mapping of coefficient A according to Equation 4 based on a polynomial regression method:

Equation 4

$$y = -2.510E - 10X^2 + 1.682E - 06x + 1.261E - 03 \quad (4)$$

Thus, coefficient A may be derived when the temperature is 100 F for a given speed N that may vary. Thus, coefficient A may be dynamically updated based on the speed N when the temperature is 100 F (e.g., X in Equation 4 is set to the speed N to derive the value for coefficient A along the Y-axis).

FIG. 6 illustrates a graph 386 of coefficient B as Function of Speed N and Constant Temperature (T=100). The curve 388 illustrates coefficient B according to Equation 5 which may be derived based on a polynomial regression method:

Equation 5

$$y = -3.899E - 09X^2 + 1.119E - 05x + 7.385E - 01 \quad (5)$$

Thus, coefficient B may be derived when the temperature is 100 F for a given speed N that may vary. As such, coefficient B may be dynamically updated based on the speed N when the temperature is 100 F (e.g., X in Equation 5 is set to the speed N to derive the value for coefficient B along the Y-axis).

FIG. 7 illustrates a graph 390 of coefficient C as Function of Speed N and Constant Temperature (T=100). The curve 392 illustrates coefficient C according to Equation 6 based on a polynomial regression method:

Equation 6

$$y = -2.882E - 06X^2 - 1.693E - 02x + 7.360E + 01 \quad (6)$$

Thus, coefficient C may be derived when the temperature is 100 F for a given speed N that may vary. As such, coefficient C may be dynamically updated based on the speed N when the temperature is 100 F (e.g., X in Equation 6 is set to the speed N to derive the value for coefficient C along the Y-axis).

Thus, each of the coefficients A, B, C may be mapped as a function of speed N and constant temperature as illustrated in graphs 380, 386, 390 and Equations 4, 5, 6. As such, the coefficients may be adjusted based on the speed N to constantly and dynamically update the coefficients A, B, C during operation based on the speed N. Similarly, the other temperatures (120 and 150) for curves 354, 356, 360, 364, 366, 368 may be analyzed to determine equations for the coefficients A, B, C at the respective temperatures for different speeds N.

The above Equations 4, 5 6 may be rewritten as follows so that the coefficients A, B, C may be determined:

Equation 7

$$A = A1.N^2 + A2.N + A3 \quad (7)$$

Equation 8

$$B = B1.N^2 + B2.N + B3 \quad (8)$$

Equation 9

$$C = C1.N^2 + C2.N + C3 \quad (9)$$

Equation 7 corresponds to Equation 4, Equation 8 corresponds to Equation 5 and Equation 9 corresponds to Equation 6. For example, A1 may be set to −2.510E, A2 may be set to 1.682 and A3 may be set to 1.261E-03. B1 may be set to −3.899, B2 may be set to 1.119 and B3 may be set to 7.385E-01. C1 may be set to −2.882, C2 may be set to −1.693 and C3 may be set to 7.360.

Further, the coefficients A, B, C of Equation 3 may be replaced with the equivalent expressions of Equations 7, 8, 9. Thus, some embodiments obtain the pressure as follows according to Equation 10 or Equation 11 which are equivalent to each other:

Equation 10

$$P = (A1.N^2 + A2.N + A3)V^2 + \\ (B1.N^2 + B2.N + B3)V + (C1.N^2 + C2.N + C3) \quad (10)$$

Equation 11

$$P = A1(N^2V^2) + A2(NV^2) + A3(V^2) + \\ B1(N^2.V) + B2(N.V) + B3(V) + (C1.N^2 + C2.N + C3) \quad (11)$$

Figure 8:
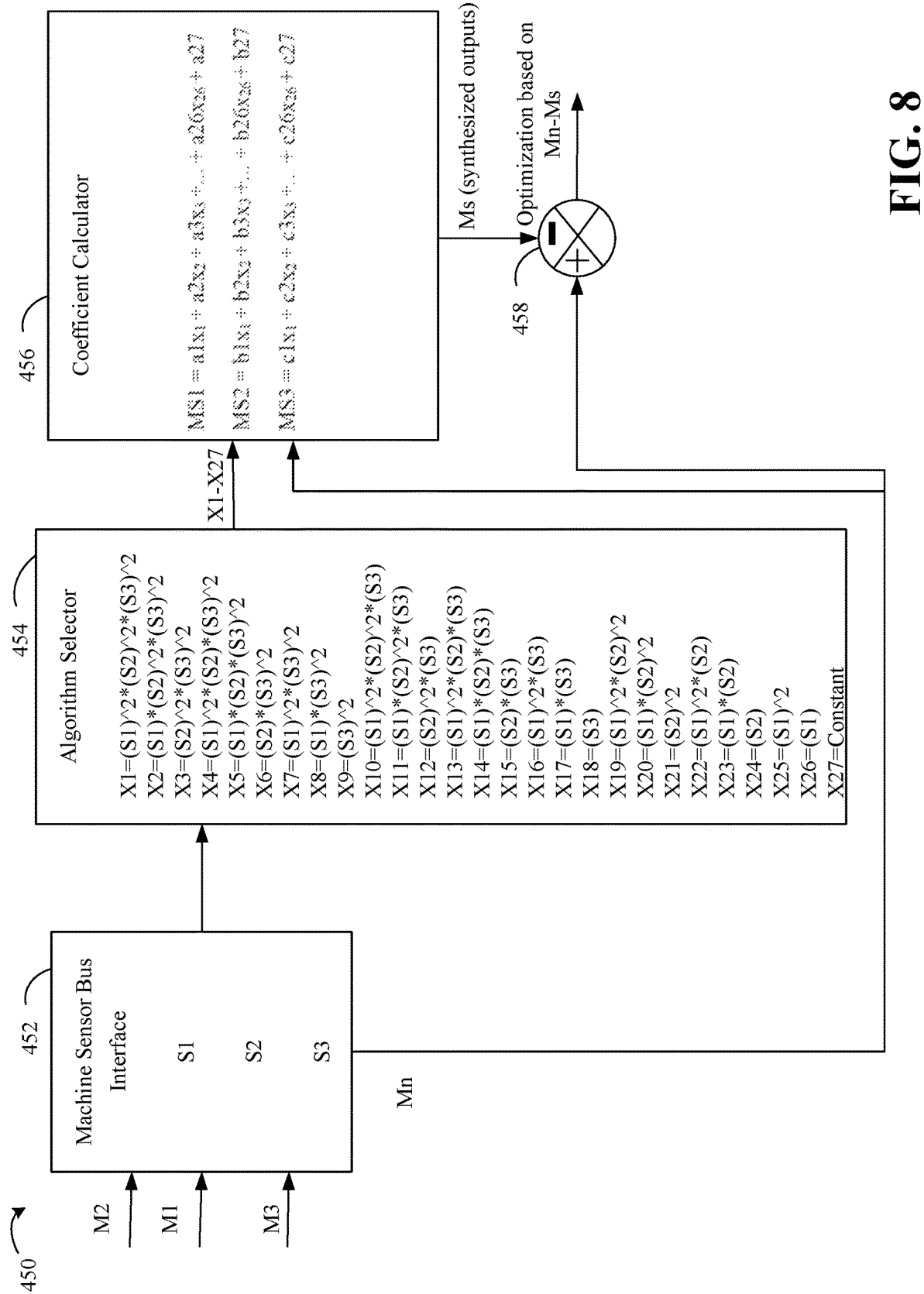
FIG. 8 is a block diagram of an example of a synthesized sensor generation and processing architecture according to an embodiment.

Based on Equation 11, P is function of 9 coefficients (A1, A2, A3, B1, B2, B3, C1, C2, C3) and the associated group of variables are called composite functions. The term composite functions are utilized because the associated groups of variables are functions of several raw variables (e.g., speed N and valve opening V). In this example each of the composite functions is a function of 2 raw variables (N, V) with different orders (e.g., $N^2V^2$, $NV^2$, NV, etc.). The above process 350 may be repeated for the remaining 2 temperatures (120, 150), to obtain a total of 26 composite functions and a constant (X1, X2, . . . , X26, Constant) as shown in FIG. 8, algorithm 454.

During operation, the 26 composite functions and a constant may be utilized. Turning now to FIG. 8, the 26 composite functions may correspond to aspects of a synthesized sensor generation and processing architecture 450. In this example, the exact pressure P is function of 3 sensors, V, N, T. The valve position V may be assigned to the first generic sensor S1, the pump speed N may be assigned to the second generic sensor S2, and the temperature T may be assigned to the third generic sensor S3 (the order is not important).

In further detail, the synthesized sensor generation and processing architecture 450 is illustrated. The synthesized sensor generation and processing architecture 450 may generally be implemented with the embodiments described herein, for example, the fault detection and processing architecture 100 (FIG. 1), the method 300 (FIG. 2), and/or process 350 (FIGS. 3-7) already discussed. The below example will reference a system that has varying valve position (P), speed (N) and temperature (T) as described herein. A machine sensor bus interface 452 is illustrated. The machine sensor bus interface 452 may identify a number of independent sensors of a system under consideration and provide the total number to the algorithm selector 454.

The algorithm selector 454 may select the composite functions that are to be used as synthesized sensors. A total number of composite functions may be calculated based on the following parameters: 1) Order (mutual effect order); 2) Number of coefficients, Nc=Order+1; and 3) Sn: number of independent sensors used to derive a synthesized sensor. According to the above example, the mutual effect has a second order (Order=2) with three independent sensors (V, N, T) or first generic sensor S1, second generic sensor S2, and third generic sensor S3 used to compute the pressure P. This combination gives 27 composite functions, including a constant by using the following Equation 12, where Ntotal is the total number of composite functions:

Equation 12

$$Ntotal = Nc^{\wedge}Sn \qquad (12)$$

The below Table 1 illustrates the total number of composite functions as a function of number of sensors used to synthesize a sensor and the type of order (e.g., a mutual interaction and/or mutual effect order) that may be of any order, such as $1^{st}$ order, $2^{nd}$ order, and/or $3^{rd}$ order. As illustrated, the number of composite functions may increase with increasing sensors and orders. The number of sensors includes the total number of sensors that are to be physically modeled.

TABLE 1

| # of Sensors used (N) | 1st Order | 2nd Order | 3rd Order |
|---|---|---|---|
| 2 | 4 | 9 | 16 |
| 3 | 8 | 27 | 64 |
| 4 | 16 | 81 | 256 |
| 5 | 32 | 243 | 1024 |

Table 1 illustrates a total number of composite functions as a function of N (the number of independent physical sensors to be used by the composite functions) and order. A general form of these functions for 3 variables (S1, S2, S3) with a $2^{nd}$ order mutual effect is shown in below in Equations 13 and is pre-loaded onto algorithm selector 454. If desired, a higher order such as $3^{rd}$ order mutual effect could be done with the same manner:

Equation 13

$$\begin{aligned}
X1 &= (S1)^{\wedge}2*(S2)^{\wedge}2*(S3)^{\wedge}2 \\
X2 &= (S1)*(S2)^{\wedge}2*(S3)^{\wedge}2 \\
X3 &= (S2)^{\wedge}2*(S3)^{\wedge}2 \\
X4 &= (S1)^{\wedge}2*(S2)*(S3)^{\wedge}2 \\
X5 &= (S1)*(S2)*(S3)^{\wedge}2 \\
X6 &= (S2)*(S3)^{\wedge}2 \\
X7 &= (S1)^{\wedge}2*(S3)^{\wedge}2 \\
X8 &= (S1)*(S3)^{\wedge}2 \\
X9 &= (S3)^{\wedge}2 \\
X10 &= (S1)^{\wedge}2*(S2)^{\wedge}2*(S3) \\
X11 &= (S1)*(S2)^{\wedge}2*(S3) \\
X12 &= (S2)^{\wedge}2*(S3) \\
X13 &= (S1)^{\wedge}2*(S2)*(S3) \\
X14 &= (S1)*(S2)*(S3) \\
X15 &= (S2)*(S3) \\
X16 &= (S1)^{\wedge}2*(S3) \\
X17 &= (S1)*(S3) \\
X18 &= (S3) \\
X19 &= (S1)^{\wedge}2*(S2)^{\wedge}2 \\
X20 &= (S1)*(S2)^{\wedge}2 \\
X21 &= (S2)^{\wedge}2 \\
X22 &= (S1)^{\wedge}2*(S2) \\
X23 &= (S1)*(S2) \\
X24 &= (S2) \\
X25 &= (S1)^{\wedge}2 \\
X26 &= (S1) \\
X27 &= \text{Constant}
\end{aligned} \qquad (13)$$

Equation 13 may be based on Equation 11. Equation 13 includes a third sensor while Equation 11 only includes two sensors (corresponding to 9 terms), and hence, Equation 13 is more extensive (corresponding to 27 terms). In the above example, several variables may be randomly assigned including S1=N, S2=V, S3=T without comprising on the robustness of the embodiments. The results remain the same if N, V, and T were assigned differently because the computation is performed with all possible combinations (i.e., a total number of composite functions mentioned above). The formulas in Equation 13 may be generic at least to the extent that the formulas are applicable to a broad class of systems. That is, the formulas in Equations 13 may be generalized and not yet specified for a particular system.

In some embodiments, Equation 13 may be programmed ahead of time and then adjusted for a particular system with a specific mutual effect order and the number of independent sensors used. Thus, some embodiments bypass lengthy processes that generate completely new composite functions for each system, and rather adjust the coefficients associated with these composite functions for different systems.

As shown in Table 1 above, if 4 different raw sensors are used, a set of 81 composites functions (some of which are unillustrated) may be utilized to cover highly non-linear mutual effect processes. In this example, the system includes three independent sensors M1-M3 for illustration purpose only. Thus, the algorithm selector 454 may determine that three sensors M1-M3 are used to model a given output sensor Mn. According to Table 1 above, 27 terms (i.e., X1-X26 composite functions and a constant) are to be calculated using these three independent sensors M1-M3. In this example, the three independent sensors are assigned to generic sensors S1, S2, S3 as denoted in the algorithm selector 454. By design, as the vast majority of industrial processes exhibits the first or second order behavior, consequently, by choosing the second order mutual effect shown in Table 1, the algorithm will cover the majority of these cases including cases with first order behavior.

The algorithm selector 454 may provide terms X1-X27 to the coefficient calculator 456. Thus, after the terms (e.g., X1, X2, Xn or X1-X27 above) are selected and/or calculated, the coefficient calculator 456 may process the terms X1-X27 by a regression algorithm (described above) to determine influence coefficients (a1-a27, b1-b27, c1-c27) for each of the 3 output sensors Mn1, Mn2, Mn3 respectively (note that independent sensors M1, M2, M3 are independent sensors whereas synthesized sensors MS1, MS2, MS3 generated synthesized outputs based on components of machine Mn (e.g., Mn1, Mn2, Mn3 machine outputs). Synthesized sensors MS1-MS3 are derived from independent sensors M1, M2, M3 and associated Mn1, Mn2, Mn3 of Mn are inputs to Coefficient Calculator 456. For example, a polynomial regression method may be used to estimate the above coefficients. The process 350 described above may be used to determine the coefficients and the Algorithm Selector 454 is readily used with the same concept.

After solving for a set of 27 coefficients associated with the above 27 terms X1-X27, the coefficient calculator 456 obtains synthesized sensors MS1-MS3 that represents the actual output sensors Mn1-Mn3. If a given independent sensor M1-M3 in the pool is independent of a given machine output process, the synthesized sensor of the synthesized sensors MS1-MS3 that is being modeled (i.e., independent state and not correlated with a selected independent sensor), a zero-influence coefficient will be obtained during the optimization process for that synthesized sensor. That is, the coefficient calculator 456 may assign a value of zero to a coefficient since none or less inter-sensor interactions are present. In contrast, if a given independent sensor M1-M3 has an effect on a given machine output sensor Mn, the corresponding synthesized sensor of the synthesized sensors MS1-MS3 being modeled will have coefficient (e.g., C1, C2, C3, etc.) proportional to that dependency. As a result, an accurate predictive maintenance through anomaly detection may be performed by comparing each output sensor Mn1-Mn3 to its associated synthesized sensor MS1-MS3 to detect any deviation indicating fault. The synthesized sensors MS1-MS3 have the following form as shown in Equation 14:

Equation 14

$$S\_Synthesized = C1*X1 + C2*X2 + C3*X3 + \cdots C26*X26 + Constant \quad (14)$$

Equation 14 is based on there being three independent sensors M1, M2, M3. Thus, 27 terms are used. However, if only two sensors existed, Equation 12 may be adjusted such that only 9 terms (e.g., C1-C8 multiplied by respective X1-X8 and a Constant) are used (see Table 1 above and Equation 11) and the remaining will be virtually zero.

As X1, X2, X3 . . . Xn may be any combination of any number of sensors and type of correlation ($1^{st}$, $2^{nd}$, $3^{rd}$ order, etc.) the composite functions X1-X26 of the terms may be referred to as generic composite functions (e.g., applicable to a broad range of systems). The accuracy of the synthesized sensor equation 14 depends on the number of terms (e.g., number of generic composite functions) used in the summation, the mutual effect order, and the type of independent sensors used. Usage of this same set of generic functions is possible.

The time to derive each fault model may be expedient and may be configured to process automatically for other applications such as production quality control (build-to-build variation assessment), detecting if an assembly meet the standard and identify root cause for quick resolve. Furthermore, since building the models (e.g., coefficient calculations) may not require significant latency, each individual machine (e.g., individual heath profile) may have its own baseline model to account for its performance variation in manufacturing and assembling. This leads to even more robust and accurate fault detection model.

The coefficient calculator 456 may generate a synthesized outputs Ms based on inputs that are provided to the system and the terms X1-X27. Each respective actual sensor Mn1-Mn3 may be modeled by terms X1-X27 that have adjusted constants (e.g., a1-a27, b1-b27 and c1-c27) depending on observed and hidden characteristics associated with the respective sensor. Thus, the values for constants a1-a27, b1-b27 and c1-c27 may be different from each other depending on the inherent characteristics of the physical system interactions at various operating conditions. Notably, the form of the equations for Mn1, Mn2 and Mn3 is the same except with different values for the constants a1-a27, b1-b27 and c1-c27.

The coefficient calculator 456 may output synthesized sensors Ms representing the actual sensor Mn. The subtractor 458 may assign a negative value to the output Ms of the coefficient calculator 456 and a positive value to an output Mn (from physical sensors M1-M3) from the system based on the inputs. The subtractor 458 may subtract the output Ms from the output Mn on a sensor-by-sensor basis (e.g., subtract the synthesized value for sensor MS1 from the actual, physical value of the sensor Mn1, etc.).

Figure 9:
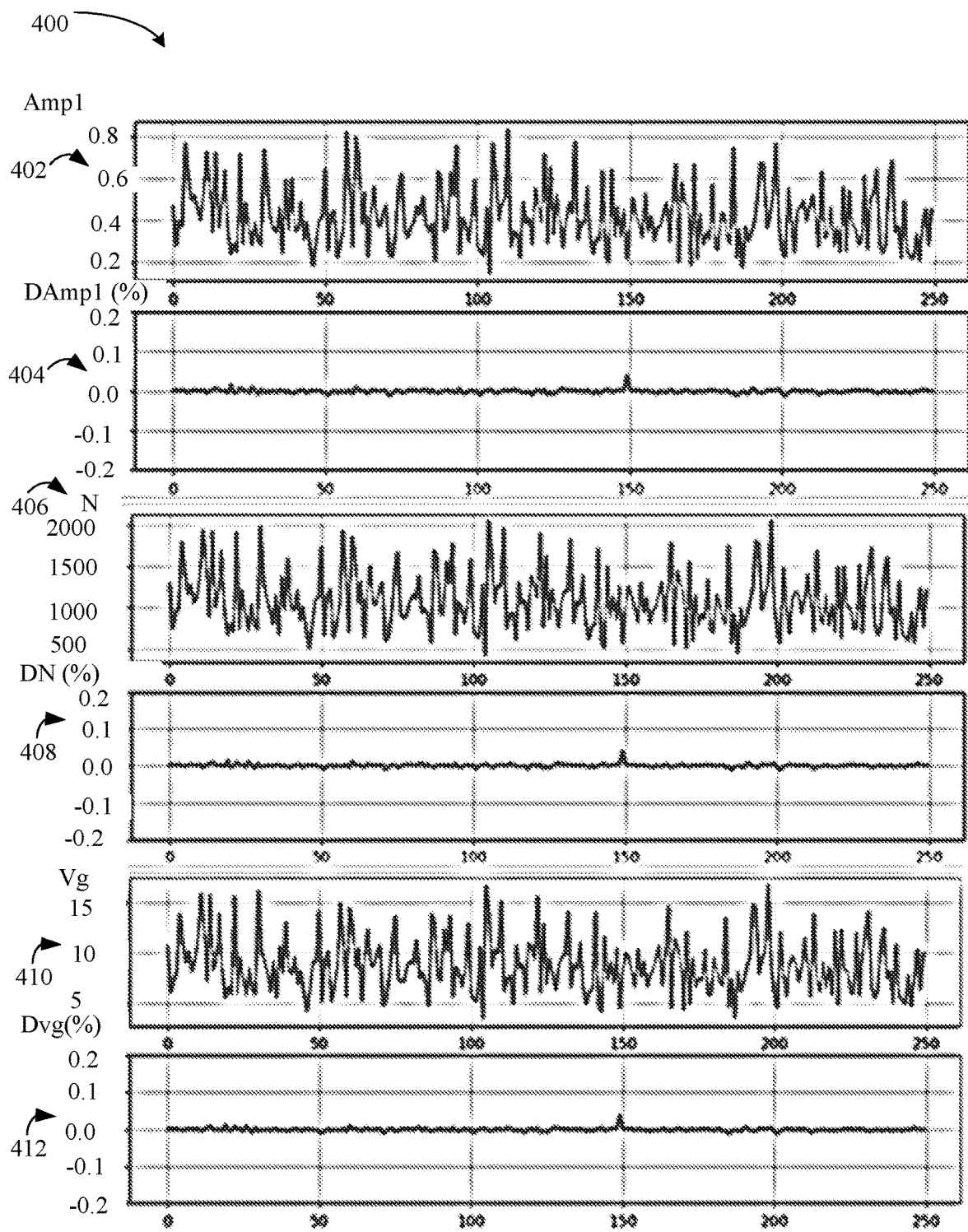
FIG. 9 is an example of an actual and synthesized graphs and comparison graphs according to an embodiment.

FIG. 9 illustrates an actual and synthesized graphs and comparison graphs 400. The graphs 400 may generally be utilized in the embodiments described herein, for example, the fault detection and processing architecture 100 (FIG. 1), the method 300 (FIG. 2), process 350 (FIGS. 3-7) and/or synthesized sensor generation and processing architecture 450 (FIG. 8). Graphs 400 correspond an example of an electrical motor and generator connected to a variable load selector to mimic the operating condition of an electrical vehicle at a constant ambient temperature. A back-to-back comparison between 3 actual sensors compared to counterpart synthesized sensors (which essentially overlap) in illustrated in graphs 402, 406, 410 using equation 11 or 13.

The accuracy of the synthesized values is calculated as the difference between the actual reading of the sensors and the synthesized values is illustrated in graphs 404, 408, 412 in terms of decimal (i.e. (Synthesized-Actual)/Actual) with the overall difference of about 0.01 (or 1% error). In this example, the first sensor corresponds to graph 402 and indicates the total current (Ampl) of the electrical motor, the second sensor corresponds to graph 406 and shows the speed (N) of the motor, and the graph 410 corresponds to the third sensor and represents the terminal voltage (Vg) of the generator. The test was performed at various operating conditions, by independently varying the input voltage Vs (14-22 volts) and the load selector R (60-100Ω). By referring to equations 11 and 13, the following is made: S1: 14≤Vs≤22, S2: 60≤R≤100, S3: T=78 F (constant).

As may be seen, the same equation 11, or 13 was used to calculate different synthesized sensors of different physical systems. After solving for 27 coefficients using statistical regression, noting that only the coefficients were different but the general form of the equation for each synthesized sensor remains the same (generic common composite functions for all synthesized sensors Amp 1, N, Vg). These sensors are part of a common system and each sensor reading depends on the intrinsic property of each process that governs by the first principles. Under these circumstances, each of these processes affects one another and self-adjust to reach a certain equilibrium (state).

Figure 10:
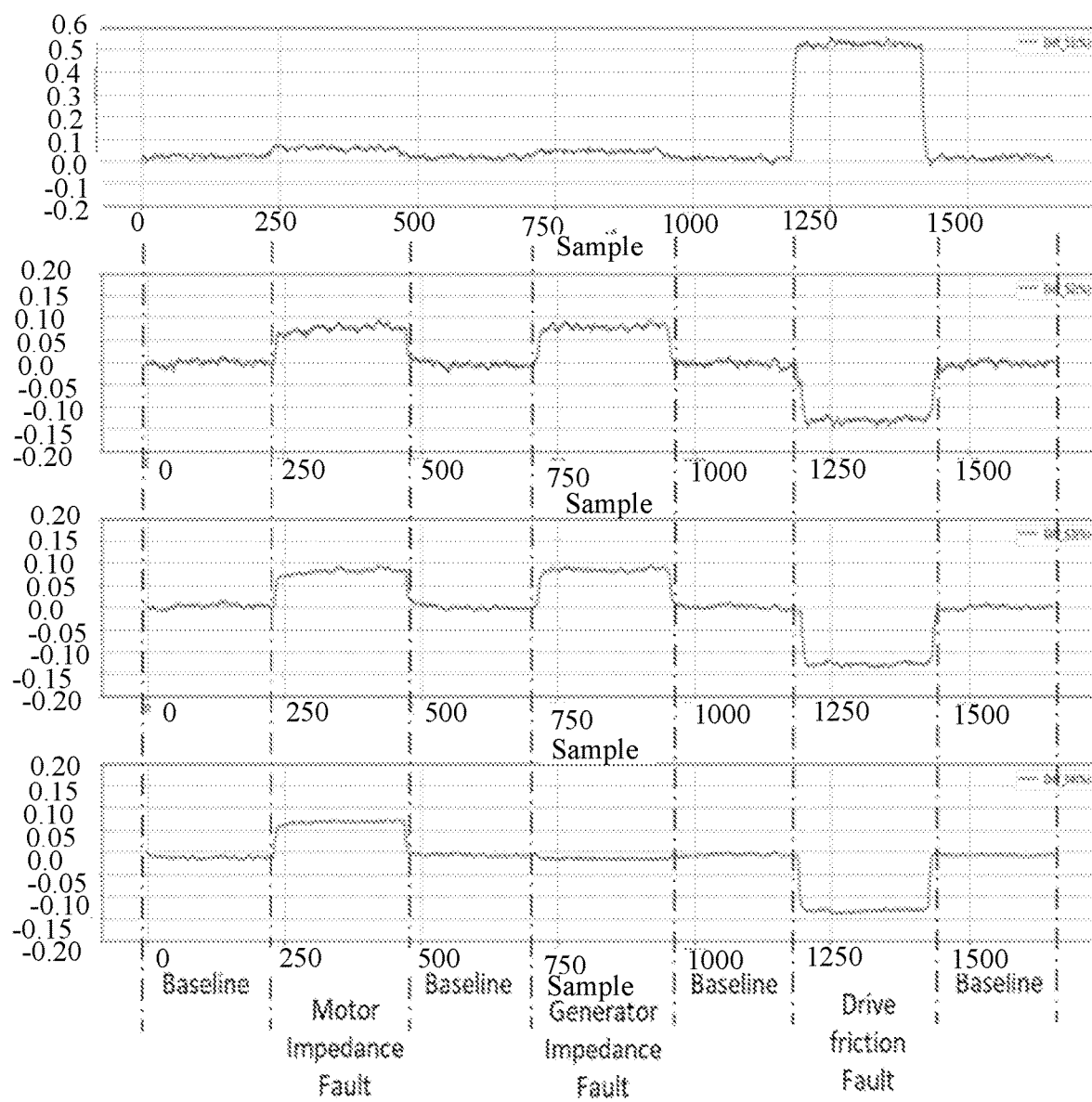
FIG. 10 is an example of graphs for an Electrical Vehicle (EV) platform according to an embodiment.

FIG. 10 illustrates graphs 520 for an Electrical Vehicle (EV) platform that has been verified according to embodiments described herein. The graphs 520 may generally be implemented with the embodiments described herein, for example, the fault detection and processing architecture 100 (FIG. 1), the method 300 (FIG. 2), process 350 (FIGS. 3-7), the synthesized sensor generation and processing architecture 450 (FIG. 8) and/or actual and synthesized graphs and comparison graphs 400 (FIG. 9) already discussed. A test bench may be equipped with an electric motor, a generator with variable load selector to simulate road profile and running condition of a vehicle, a mechanical brake as well as a magnetic brake were also included. To simulate faults of the system, the bench was also equipped with switches to activate and short some part of the electrical circuit to mimic electrical and winding short in the system.

FIG. 10 shows the real-time testing of such platform at different running condition with and without faults injected along the way. As can be seen from FIG. 10, during the baseline operation (no fault injected), the differences (Delta) between the synthesized and actual sensors were within (±1%) indicating the accuracy and effectiveness of the embodiments. Furthermore, as soon as a small amount of fault was injected, a tangible/significant change in the Delta values of 4 different sensors (Total Current (S1), Generator Current (S2), Generator Voltage (S3), Speed (S4)) was observed indicating that the method is very effective to detect anomaly/fault. Each fault generates different change patterns of Delta as shown in the figure. For example, when the motor impedance fault was injected, all 4 residual errors increased as opposed to the generator impedance fault where only the first 3 residual errors increased. A drive friction fault induced in the gearbox significantly increased the total current of the system while the remaining 3 residual errors decreased substantially. The positive and negative changes with respect to baseline (or zero) of these residual differences form fault patterns that could be used to identify a given failure mode.

Figure 11:
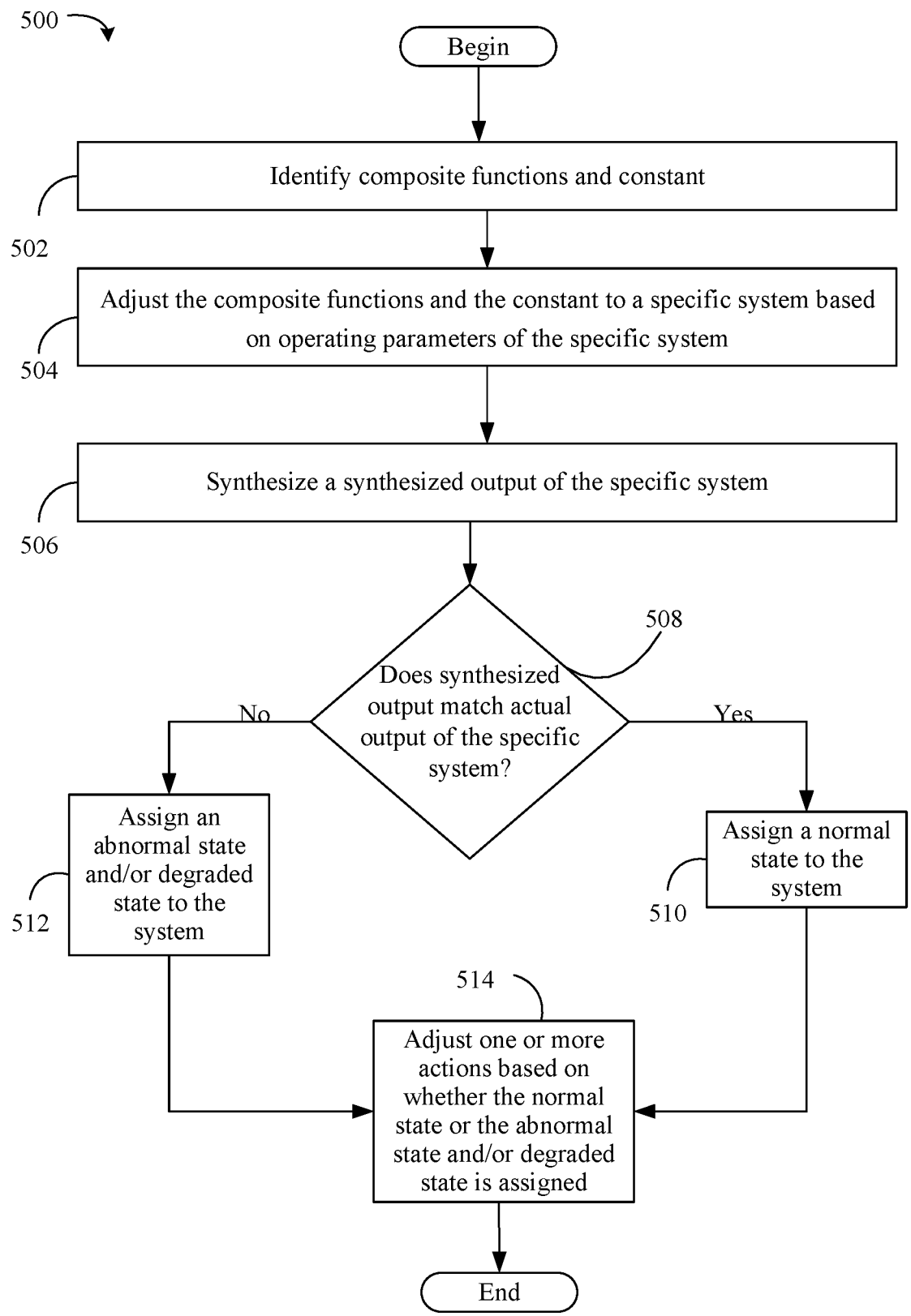
FIG. 11 is a flowchart of an example of a method of assigning states to a system according to an embodiment.

FIG. 11 shows a method 500 of assigning states to a system. The method 500 may generally be implemented with the embodiments described herein, for example, the fault detection and processing architecture 100 (FIG. 1), the method 300 (FIG. 2), process 350 (FIGS. 3-7), the synthesized sensor generation and processing architecture 450 (FIG. 8), actual and synthesized graphs and comparison graphs 400 (FIG. 9) and/or graphs 520 for an Electrical Vehicle (EV) platform (FIG. 10) already discussed. The method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 identifies composite functions and a constant. The composite functions and the constant may be applicable to a large array of varied systems. Illustrated processing block 504 adjusts the composite functions and the constant to a specific system based on operating parameters (e.g., independent sensors input, applied voltage, current, temperature, pressure, valve opening, etc.) of the specific system. Illustrated processing block 506 synthesizes a synthesized output of the specific system. The synthesized output may model healthy behavior of the specific system. Illustrated processing block 508 determines if the synthesized output matches an actual output of the specific system. For example, the synthesized output may be subtracted from the actual output to generate a difference. If the difference meets a threshold (i.e., the actual output deviates from the synthesized output by a margin), the actual output may be considered to be anomalous or exhibiting atypical behavior (e.g., the actual output no longer models healthy behavior). If the synthesized model does not match the actual output of the specific system, illustrated processing block 512 assigns an abnormal state and/or degraded state to the system. Otherwise, illustrated processing block 510 assigns a normal state to the system. Illustrated processing block 514 adjusts one or more actions based on whether the normal state or the abnormal state and/or degraded state is assigned. For example, if the normal state is assigned, a maintenance schedule may be adjusted, an increased workload may be assigned to the specific system, etc. If the abnormal state and/or degraded state is assigned, a reduced workload may be assigned to the specific system, maintenance may be scheduled, degraded portions of the specific system may be bypassed to avoid utilizing and/or assigning operations to the degraded portions, etc.

Figure 12:
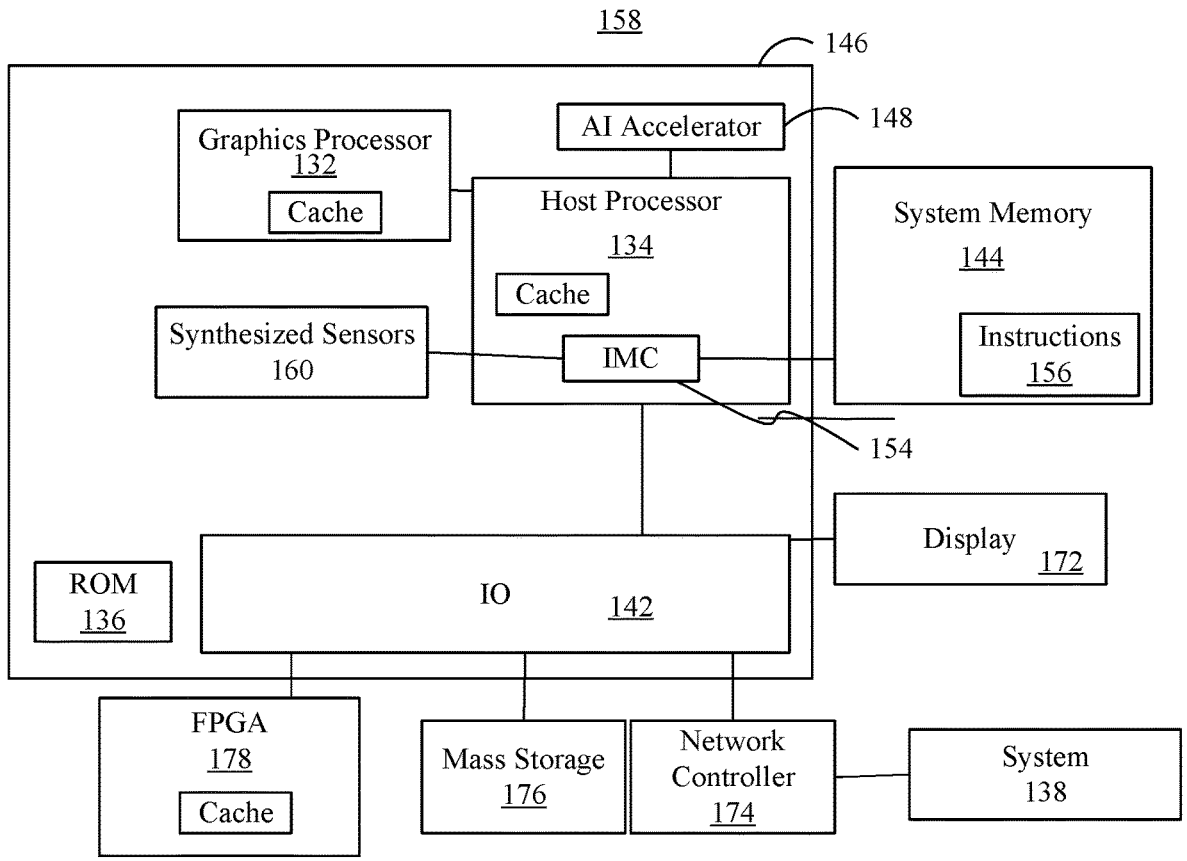
FIG. 12 is a block diagram of an example of a security and robustness enhanced computing system according to an embodiment.

Turning now to FIG. 12, a security and robustness enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the computing system 158 includes a host processor 134 (e.g., CPU) having an integrated memory controller (IMC) 154 that is coupled to a system memory 144.

The illustrated computing system 158 also includes an input output (IO) module 142 implemented together with the host processor 134, a graphics processor 132 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). Furthermore, the SoC 146 may further include processors (not shown) and/or the AI accelerator 148 dedicated to artificial intelligence (AI) and/or neural network (NN) processing. For example, the system SoC 146 may include vision processing units (VPUs) and/or other AI/NN-specific processors such as AI accelerator 148, etc. In some embodiments, any aspect of the embodiments described herein may be implemented in the processors and/or accelerators dedicated to AI and/or NN processing such as AI accelerator 148, the graphics processor 132 and/or the host processor 134.

The graphics processor 132 and/or the host processor 134 may execute instructions 156 retrieved from the system memory 144 (e.g., a dynamic random-access memory) and/or the mass storage 176 to implement aspects as described herein. For example, the graphics processor 132 and/or the host processor 134 may receive data (e.g., an actual output of sensors) from system 138 via network controller 174. The host processor 134 and/or graphics processor 132 may generate synthesized sensors 160 that generate a synthesized output. The graphics processor 132 and/or the host processor 134 may compare the synthesized output to the physical output to determine whether an anomaly has occurred.

When the instructions 156 are executed, the computing system 158 may implement one or more aspects of the embodiments described herein. For example, the computing system 158 may implement one or more aspects of the fault detection and processing architecture 100 (FIG. 1), the method 300 (FIG. 2), process 350 (FIGS. 3-7), the synthesized sensor generation and processing architecture 450 (FIG. 8), actual and synthesized graphs and comparison graphs 400 (FIG. 9), graphs 520 for an Electrical Vehicle (EV) platform (FIG. 10) and/or method 500 (FIG. 11) already discussed. The illustrated computing system 158 is therefore considered to be performance-enhanced at least to the extent that it enables the computing system 158 to robustly detect anomalies in an efficient manner with reduced latency and compute resources.

Figure 13:
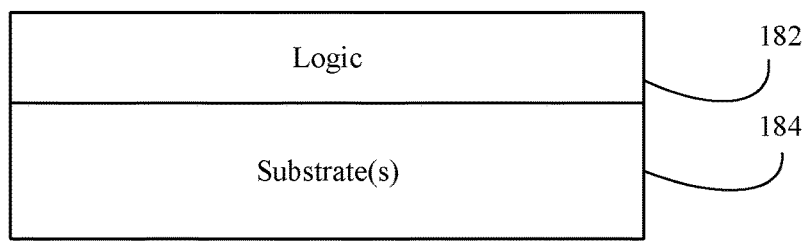
FIG. 13 is an illustration of an example of a semiconductor apparatus according to an embodiment.

FIG. 13 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, The apparatus 186 may generally implement the embodiments described herein, for example, the fault detection and processing architecture 100 (FIG. 1), the method 300 (FIG. 2), process 350 (FIGS. 3-7), the synthesized sensor generation and processing architecture 450 (FIG. 8), actual and synthesized graphs and comparison graphs 400 (FIG. 9), graphs 520 for an Electrical Vehicle (EV) platform (FIG. 10) and/or method 500 (FIG. 11) already discussed. The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 14:
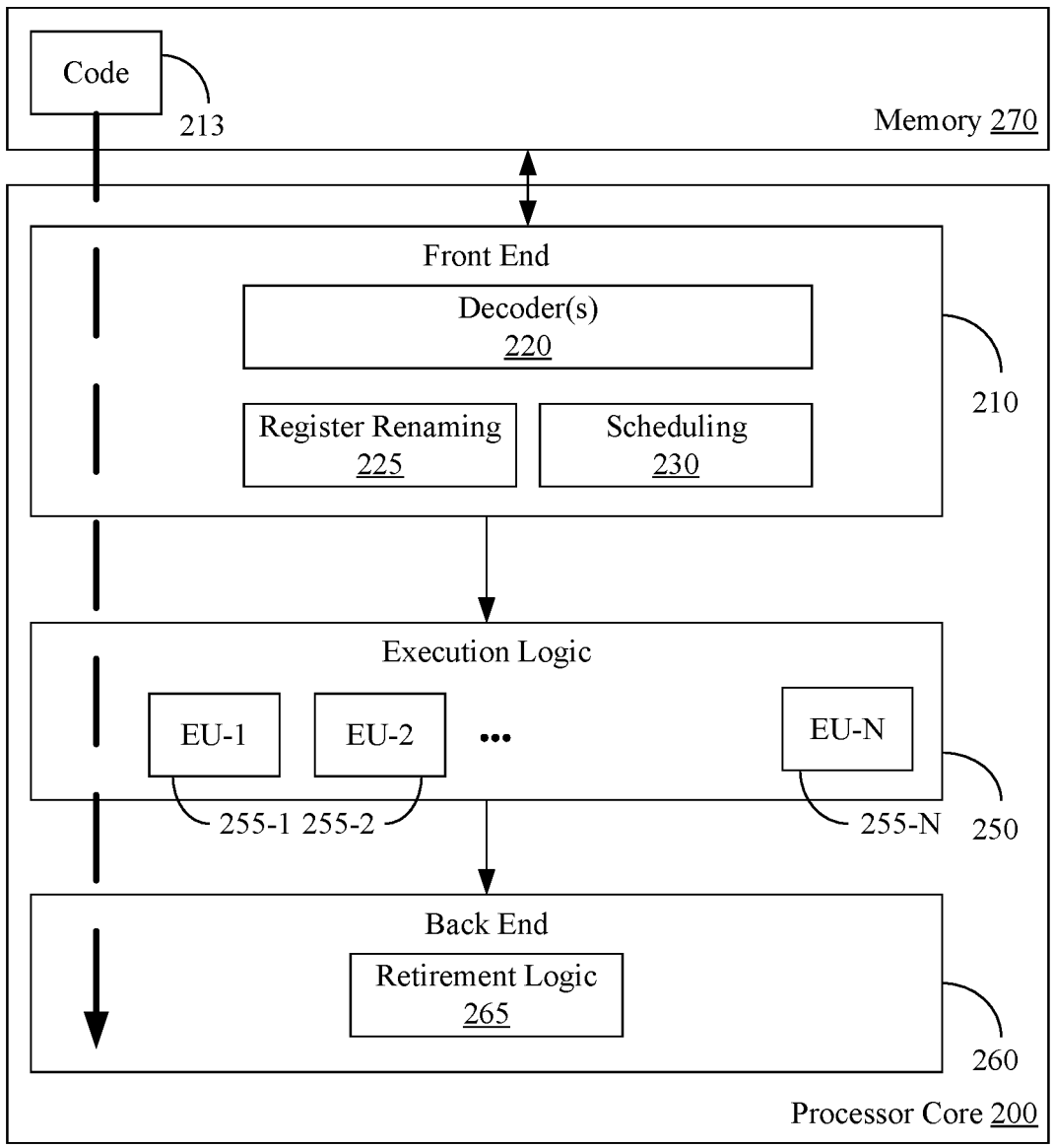
FIG. 14 is a block diagram of an example of a processor according to an embodiment.

FIG. 14 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 14, a processing element may alternatively include more than one of the processor core 200 illustrated in FIG. 14. The processor core 200 may be a single-threaded core or, for at least one embodiment, the processor core 200 may be multithreaded in that it may include more than one hardware thread context (or "logical processor") per core.

FIG. 14 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the fault detection and processing architecture 100 (FIG. 1), the method 300 (FIG. 2), process 350 (FIGS. 3-7), the synthesized sensor generation and processing architecture 450 (FIG. 8), actual and synthesized graphs and comparison graphs 400 (FIG. 9), graphs 520 for an Electrical Vehicle (EV) platform (FIG. 10) and/or method 500 (FIG. 11) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include several execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back-end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 14, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 15, shown is a block diagram of a computing system 1000 embodiment in accordance with an embodiment. Shown in FIG. 15 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood any or all the interconnects illustrated in FIG. 15 may be implemented as a multi-drop bus rather than point-to-point interconnect.

As shown in FIG. 15, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner like that discussed above in connection with FIG. 14.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 15, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 15, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 15, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the fault detection and processing architecture 100 (FIG. 1), the method 300 (FIG. 2), process 350 (FIGS. 3-7), the synthesized sensor generation and processing architecture 450 (FIG. 8), actual and synthesized graphs and comparison graphs 400 (FIG. 9), graphs 520 for an Electrical Vehicle (EV) platform (FIG. 10) and/or method 500 (FIG. 11). Further, an audio I/O 1024 may be coupled to second bus 1020 and a battery 1010 may supply power to the computing system 1000.

Note that other embodiments are contemplated. For example, instead of the point-to-point architecture of FIG. 15, a system may implement a multi-drop bus or another such communication topology. Also, the elements of FIG. 15 may alternatively be partitioned using more or fewer integrated chips than shown in FIG. 15.

Additional Notes and Examples

Example 1 includes a computing system comprising a network controller to communicate with a device having a first plurality of sensors that senses conditions of operations of a system as the system executes a process based on a first input, wherein the conditions are stored as a first output, a processor coupled to the network controller, and a memory coupled to the processor, the memory including a set of executable program instructions, which when executed by the processor, cause the computing system to generate synthesized sensors that synthesize operations of the first plurality of sensors, generate a second output based on the synthesized sensors and the first input, and detect whether one or more of a degradation and an anomalous state exists based on a comparison of the first output to the second output.

Example 2 includes the computing system of Example 1, wherein the executable program instructions, when executed, cause the computing system to generate composite functions that are applicable to different pluralities of sensors, adjust coefficients of the composite functions based on interactions between the first plurality of sensors to generate adjusted composite functions, and set the synthesized sensors as the adjusted composite functions.

Example 3 includes the computing system of Example 2, wherein the executable program instructions, when executed, cause the computing system to determine the coefficients based on variables associated with the first plurality of sensors.

Example 4 includes the computing system of any one of Examples 1 to 3, wherein the executable program instructions, when executed, cause the computing system to detect a normal operation state in response to a deviation pattern of the first output and the second output being below a predetermined threshold.

Example 5 includes the computing system of any one of Examples 1 to 4, wherein the executable program instructions, when executed, cause the computing system to detect the one or more of the degradation and the anomalous state in response to a deviation pattern between the first output and the second output meeting a threshold.

Example 6 includes the computing system of any one of Examples 1 to 5, wherein the synthesized sensors are digital versions of the first plurality of sensors.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to generate synthesized sensors that synthesize operations of a first plurality of sensors, wherein the first plurality of sensors are to sense conditions of operations of a system as the system executes a process based on a first input, and wherein the conditions are stored as a first output, generate a second output based on the synthesized sensors and the first input, and detect whether one or more of a degradation and an anomalous state exists based on a comparison of the first output to the second output.

Example 8 includes the apparatus of Example 7, wherein the logic coupled to the one or more substrates is to generate composite functions that are applicable to different pluralities of sensors, adjust coefficients of the composite functions based on interactions between the first plurality of sensors to generate adjusted composite functions, and set the synthesized sensors as the adjusted composite functions.

Example 9 includes the apparatus of Example 8, wherein the logic coupled to the one or more substrates is to determine the coefficients based on variables associated with the first plurality of sensors.

Example 10 includes the apparatus of any one of Examples 7 to 9, wherein the logic coupled to the one or more substrates is to detect a normal operation state in response to a deviation pattern of the first output and the second output being below a predetermined threshold.

Example 11 includes the apparatus of any one of Examples 7 to 10, wherein the logic coupled to the one or more substrates is to detect the one or more of the degradation and the anomalous state in response to a deviation pattern between the first output and the second output meeting a threshold.

Example 12 includes the apparatus of any one of Examples 7 to 11, wherein the synthesized sensors are digital versions of the first plurality of sensors.

Example 13 includes the apparatus of Example 7, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to generate synthesized sensors that synthesize operations of a first plurality of sensors, wherein the first plurality of sensors are to sense conditions of operations of a system as the system executes a process based on a first input, wherein the conditions are stored as a first output, generate a second output based on the synthesized sensors and the first input, and detect whether one or more of a degradation and an anomalous state exists based on a comparison of the first output to the second output.

Example 15 includes the at least one computer readable storage medium of Example 14, wherein the instructions, when executed, further cause the computing system to generate composite functions that are applicable to different pluralities of sensors, adjust coefficients of the composite functions based on interactions between the first plurality of sensors to generate adjusted composite functions, and set the synthesized sensors as the adjusted composite functions.

Example 16 includes the at least one computer readable storage medium of Example 15, wherein the instructions, when executed, further cause the computing system to determine the coefficients based on variables associated with the first plurality of sensors.

Example 17 includes the at least one computer readable storage medium of any one of Examples 14 to 16, wherein the instructions, when executed, further cause the computing system to detect a normal operation state in response to a deviation pattern of the first output and the second output being below a predetermined threshold.

Example 18 includes the at least one computer readable storage medium of any one of Examples 14 to 17, wherein the instructions, when executed, further cause the computing system to detect the one or more of the degradation and the anomalous state in response to a deviation pattern between the first output and the second output meeting a threshold.

Example 19 incudes the at least one computer readable storage medium of any one of Examples 14 to 18, wherein the synthesized sensors are digital versions of the first plurality of sensors.

Example 20 includes a method comprising generating synthesized sensors that synthesize operations of a first plurality of sensors, wherein the first plurality of sensors sense conditions of operations of a system as the system executes a process based on a first input, wherein the conditions are stored as a first output, generating a second output based on the synthesized sensors and the first input, and detecting whether one or more of a degradation and an anomalous state exists based on a comparison of the first output to the second output.

Example 21 includes the method of Example 20, further comprising generating composite functions that are applicable to different pluralities of sensors, adjusting coefficients of the composite functions based on interactions between the first plurality of sensors to generate adjusted composite functions, and setting the synthesized sensors as the adjusted composite functions.

Example 22 includes the method of Example 21, further comprising determining the coefficients based on variables associated with the first plurality of sensors.

Example 23 includes the method of any one of Examples 20 to 22, further comprising detecting a normal operation state in response to a deviation pattern of the first output and the second output being below a predetermined threshold.

Example 24 includes the method of any one of Examples 20 to 23, further comprising detecting the one or more of the degradation and the anomalous state in response to a deviation pattern between the first output and the second output meeting a threshold.

Example 25 includes the method of any one of Examples 20 to 24, wherein the synthesized sensors are digital versions of the first plurality of sensors.

Example 26 includes an apparatus comprising means for generating synthesized sensors that synthesize operations of a first plurality of sensors, wherein the first plurality of sensors sense conditions of operations of a system as the system executes a process based on a first input, wherein the conditions are stored as a first output, means for generating a second output based on the synthesized sensors and the first input, and means for detecting whether one or more of a degradation and an anomalous state exists based on a comparison of the first output to the second output.

Example 27 includes the apparatus of Example 26, further comprising means for generating composite functions that are applicable to different pluralities of sensors, means for adjusting coefficients of the composite functions based on interactions between the first plurality of sensors to generate adjusted composite functions, and means for setting the synthesized sensors as the adjusted composite functions.

Example 28 includes the apparatus of Example 27, further comprising means for determining the coefficients based on variables associated with the first plurality of sensors.

Example 29 includes the apparatus of any one of Examples 26 to 28, further comprising means for detecting a normal operation state in response to a deviation pattern of the first output and the second output being below a predetermined threshold.

Example 30 includes the apparatus of any one of Examples 26 to 29, further comprising means for detecting the one or more of the degradation and the anomalous state in response to a deviation pattern between the first output and the second output meeting a threshold.

Example 31 includes the apparatus of any one of Examples 26 to 30, wherein the synthesized sensors are digital versions of the first plurality of sensors.

Thus, technology described herein may provide an enhanced apparatus, system and method for analyzing whether an error or anomalous event has occurred. The technology may be based on an adaptable analysis that varies based on operating conditions to effectively track whether the output of the sensors matches an expected output based on the operating conditions. Further, embodiments as described herein may effectively model interactions between different components in the system to accurately identify where errors and anomalies are occurring.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical, or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
 a network controller to communicate with a device having a first plurality of sensors that senses conditions of operations of a system as the system executes a process based on a first input, wherein the sensed conditions are stored as a first output;
 a processor coupled to the network controller; and
 a memory coupled to the processor, the memory including a set of executable program instructions, which when executed by the processor, cause the computing system to:
  generate synthesized sensors that synthesize operations of the first plurality of sensors,
  generate a second output based on the synthesized sensors and the first input, detect whether one or more of a degradation and an anomalous state exists based on a comparison of the first output to the second output,
  generate composite functions that are applicable to different pluralities of sensors,
  adjust coefficients of the composite functions to model mutual interactions between the first plurality of sensors, and
  set the synthesized sensors as the adjusted composite functions.

2. The computing system of claim 1, wherein the executable program instructions, when executed, cause the computing system to determine the coefficients based on variables associated with the first plurality of sensors.

3. The computing system of claim 1, wherein the executable program instructions, when executed, cause the computing system to detect a normal operation state in response to a deviation pattern of the first output and the second output being below a predetermined threshold.

4. The computing system of claim 1, wherein the executable program instructions, when executed, cause the computing system to detect the one or more of the degradation and the anomalous state in response to a deviation pattern between the first output and the second output meeting a threshold.

5. The computing system of claim 1, wherein the synthesized sensors are digital versions of the first plurality of sensors.

6. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
generate synthesized sensors that synthesize operations of a first plurality of sensors, wherein the first plurality of sensors are to sense conditions of operations of a system as the system executes a process based on a first input, and wherein the sensed conditions are stored as a first output;
generate a second output based on the synthesized sensors and the first input;
detect whether one or more of a degradation and an anomalous state exists based on a comparison of the first output to the second output;
generate composite functions that are applicable to different pluralities of sensors;
adjust coefficients of the composite functions to model mutual interactions between the first plurality of sensors; and
set the synthesized sensors as the adjusted composite functions.

7. The apparatus of claim 6, wherein the logic coupled to the one or more substrates is to:
determine the coefficients based on variables associated with the first plurality of sensors.

8. The apparatus of claim 6, wherein the logic coupled to the one or more substrates is to:
detect a normal operation state in response to a deviation pattern of the first output and the second output being below a predetermined threshold.

9. The apparatus of claim 6, wherein the logic coupled to the one or more substrates is to:
detect the one or more of the degradation and the anomalous state in response to a deviation pattern between the first output and the second output meeting a threshold.

10. The apparatus of claim 6, wherein the synthesized sensors are digital versions of the first plurality of sensors.

11. The apparatus of claim 6, wherein the logic coupled to the one or more substrates includes transistor channel regions that are positioned within the one or more substrates.

12. At least one non-transitory computer readable storage medium comprising a set of executable program instructions, which when executed by a computing system, cause the computing system to:
generate synthesized sensors that synthesize operations of a first plurality of sensors, wherein the first plurality of sensors is to sense conditions of operations of a system as the system executes a process based on a first input, wherein the sensed conditions are stored as a first output;
generate a second output based on the synthesized sensors and the first input;
detect whether one or more of a degradation and an anomalous state exists based on a comparison of the first output to the second output;
generate composite functions that are applicable to different pluralities of sensors;
adjust coefficients of the composite functions to model mutual interactions between the first plurality of sensors; and
set the synthesized sensors as the adjusted composite functions.

13. The at least one non-transitory computer readable storage medium of claim 12, wherein the instructions, when executed, further cause the computing system to:
determine the coefficients based on variables associated with the first plurality of sensors.

14. The at least one non-transitory computer readable storage medium of claim 12, wherein the instructions, when executed, further cause the computing system to:
detect a normal operation state in response to a deviation pattern of the first output and the second output being below a predetermined threshold.

15. The at least one non-transitory computer readable storage medium of claim 12, wherein the instructions, when executed, further cause the computing system to:
detect the one or more of the degradation and the anomalous state in response to a deviation pattern between the first output and the second output meeting a threshold.

16. The at least one non-transitory computer readable storage medium of claim 12, wherein the synthesized sensors are digital versions of the first plurality of sensors.

17. A method comprising:
generating synthesized sensors that synthesize operations of a first plurality of sensors, wherein the first plurality of sensors sense conditions of operations of a system as the system executes a process based on a first input, wherein the sensed conditions are stored as a first output;
generating a second output based on the synthesized sensors and the first input;
detecting whether one or more of a degradation and an anomalous state exists based on a comparison of the first output to the second output;
generating composite functions that are applicable to different pluralities of sensors;
adjusting coefficients of the composite functions to model mutual interactions between the first plurality of sensors; and
setting the synthesized sensors as the adjusted composite functions.

18. The method of claim 17, further comprising:
determining the coefficients based on variables associated with the first plurality of sensors.

19. The method of claim 17, further comprising:
detecting a normal operation state in response to a deviation pattern of the first output and the second output being below a predetermined threshold.

20. The method of claim 17, further comprising:
detecting the one or more of the degradation and the anomalous state in response to a deviation pattern between the first output and the second output meeting a threshold.

21. The method of claim 17, wherein the synthesized sensors are digital versions of the first plurality of sensors.

* * * * *